(12) United States Patent
Hu et al.

(10) Patent No.: US 12,081,320 B2
(45) Date of Patent: Sep. 3, 2024

(54) OPTICAL SWITCHING METHOD AND APPARATUS, LIQUID CRYSTAL ON SILICON, AND WAVELENGTH SELECTIVE SWITCH

(71) Applicant: HUAWEI TECHNOLOGIES CO., LTD., Guangdong (CN)

(72) Inventors: Hangting Hu, Wuhan (CN); Yuanwu Wang, Wuhan (CN); Shengqian Zhong, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 137 days.

(21) Appl. No.: 17/828,662

(22) Filed: May 31, 2022

(65) Prior Publication Data

US 2022/0294550 A1  Sep. 15, 2022

Related U.S. Application Data

(63) Continuation of application No. PCT/CN2021/120848, filed on Sep. 27, 2021.

(30) Foreign Application Priority Data

Oct. 13, 2020  (CN) .......................... 202011089257.0

(51) Int. Cl.
*H04J 14/02* (2006.01)
*H04Q 11/00* (2006.01)

(52) U.S. Cl.
CPC ...... *H04J 14/0212* (2013.01); *H04Q 11/0005* (2013.01)

(58) Field of Classification Search
CPC ......... H04J 14/0212; H04Q 2011/0015; H04Q 2011/0016; H04Q 2011/0024; H04Q 2011/0035
See application file for complete search history.

(56) References Cited

U.S. PATENT DOCUMENTS 8,867,917 B2  10/2014  Frisken et al.
2003/0081283 A1  5/2003  Ishizuka et al.
(Continued)

FOREIGN PATENT DOCUMENTS

CN  103281153 A  9/2013
CN  110120839 A  8/2019
(Continued)

OTHER PUBLICATIONS

Extended European Search Report in European Appln No. 21879241.4, dated May 31, 2023, 42 pages.
(Continued)

*Primary Examiner* — Nathan M Cors
(74) *Attorney, Agent, or Firm* — Fish & Richardson P.C.

(57) ABSTRACT

This application provides example optical switching methods and example apparatuses. One example method includes generating K images that are consecutive in time sequence, where a first wavelength channel and at least one second wavelength channel are switched to a blocking state through a same image in the K images, and a value of K depends on a quantity of times that attenuation adjustment is performed for switching the first wavelength channel from a normal state to the blocking state. Information about the K images can then be sent to an optical switching element to enable the optical switching element to perform attenuation adjustment on the first wavelength channel and the at least one second wavelength channel.

18 Claims, 12 Drawing Sheets

(56) References Cited

U.S. PATENT DOCUMENTS

| | | | | |
|---|---|---|---|---|
| 2010/0039694 A1* | 2/2010 | Wagener | ............... | G02B 26/02 |
| | | | | 359/290 |
| 2012/0328291 A1* | 12/2012 | Frisken | ............. | H04Q 11/0005 |
| | | | | 398/48 |
| 2013/0028556 A1* | 1/2013 | Cohen | .................... | G02B 6/353 |
| | | | | 385/17 |
| 2016/0197695 A1* | 7/2016 | Seno | ...................... | G02B 26/08 |
| | | | | 398/83 |
| 2019/0149897 A1* | 5/2019 | Jiang | ................. | H04Q 11/0005 |
| | | | | 385/16 |

FOREIGN PATENT DOCUMENTS

| | | | |
|---|---|---|---|
| WO | 2018104725 A1 | 6/2018 | |
| WO | 2018187930 A1 | 10/2018 | |
| WO | 2018214173 A1 | 11/2018 | |

OTHER PUBLICATIONS

International Search Report and Written Opinion in International Appln. No. PCT/CN2021/120848, mailed on Dec. 30, 2021, 13 pages (with partial English translation).

\* cited by examiner

OPTICAL SWITCHING METHOD AND APPARATUS, LIQUID CRYSTAL ON SILICON, AND WAVELENGTH SELECTIVE SWITCH

CROSS-REFERENCE TO RELATED APPLICATIONS

This application is a continuation of International Application No. PCT/CN2021/120848, filed on Sep. 27, 2021, which claims priority to Chinese Patent Application No. 202011089257.0, filed on Oct. 13, 2020. The disclosures of the aforementioned applications are hereby incorporated by reference in their entireties.

TECHNICAL FIELD

Embodiments of this application relate to the communication field, and more specifically, to an optical switching method and apparatus, a liquid crystal on silicon, a wavelength selective switch, and a reconfigurable optical add-drop multiplexer.

BACKGROUND

A large-scale reconfigurable optical add-drop multiplexer (Reconfigurable Optical Add-Drop Multiplexer, ROADM) network is a main development direction of a wavelength division multiplexing (Wavelength Division Multiplexing, WDM) transmission system in the future. A wavelength selective switch (Wavelength Selective Switch, WSS) is a core component in ROADM networking, has functions such as control of service connectivity, wavelength switching, and channel change, and can mitigate wavelength competition in a complex network, thereby significantly improving network configuration flexibility.

The WSS may implement, through a software-controlled optical path, a function of attenuating any wavelength service to enable the service to be allocated to any port. A liquid crystal on silicon (Liquid Crystal on Silicon, LCOS) or an LCOS array is one of components configured to implement the foregoing function.

FIG. 1 shows an example of a WSS having an LCOS. As shown in FIG. 1, for a multi-wavelength multiplexing signal that is incident from a same port, a lens group and a grating in the WSS perform spatial separation on wavelengths in the multi-wavelength multiplexing signal, and project signals of different wavelengths to different regions (or pixels in different regions) of the LCOS respectively. Each pixel can be independently adjusted. A reflection angle and reflection intensity of an illumination wavelength of the pixel can be adjusted by controlling a liquid crystal phase in the pixel. In this way, ports with different wavelengths can be opened/blocked or switched, and an optical path that can be further controlled by software.

Because an online operation needs to be supported, when the WSS schedules some services (or wavelengths corresponding to the services), operating stability of other non-scheduling services needs to be ensured.

However, in a conventional technology, phase adjustment of pixels that are in an LCOS and that correspond to wavelengths is independently performed, and port opening and blocking may cause power fluctuation of a multiplexing optical signal. The foregoing phase adjustment that is performed independently may cause frequent power fluctuation, and cause inaccurate power control of an optical component at a back end of a network. Consequently, operating stability of a non-scheduling service cannot be ensured, and WSS performance is severely affected.

SUMMARY

This application provides an optical switching method and apparatus, a liquid crystal on silicon, and a wavelength selective switch, to improve accuracy of power control of an optical component at a back end of a network, improve operating stability of a non-scheduling service, and improve WSS performance.

According to a first aspect, an optical switching method is provided. The method is applied to performing attenuation adjustment on at least two wavelength channels of an optical switching element, the at least two wavelength channels include a first wavelength channel and a second wavelength channel, and the method includes: generating K images that are consecutive in time sequence, where the first wavelength channel and the second wavelength channel are switched to a blocking state through a same image in the K images, K is an integer greater than or equal to 2, a value of K depends on a quantity of times that attenuation adjustment is performed for switching the first wavelength channel (specifically, an original port of the first wavelength channel) from a normal state to the blocking state, each of the K images includes a first sub-image and a second sub-image, the first sub-image indicates an attenuation adjustment value of the first wavelength channel, and the second sub-image indicates an attenuation adjustment value of the second wavelength channel; and sending information about the K images to the optical switching element, to enable the optical switching element to perform attenuation adjustment on the first wavelength channel and the second wavelength channel.

Alternatively, the method includes: determining a blocking moment of the second wavelength channel based on a blocking moment of the first wavelength channel, and generating K images that are consecutive in time sequence, where the blocking moment of the second wavelength channel is the same as the blocking moment of the first wavelength channel, the first wavelength channel and the second wavelength channel are switched to a blocking state through a first image in the K images, the first image corresponds to the blocking moment of the first wavelength channel. K is an integer greater than or equal to 2, each of the K images includes a first sub-image and a second sub-image, the first sub-image indicates an attenuation adjustment value of the first wavelength channel, and the second sub-image indicates an attenuation adjustment value of the second wavelength channel; and sending information about the K images to the optical switching element, to enable the optical switching element to perform attenuation adjustment on the first wavelength channel and the second wavelength channel.

According to this solution provided in this application, attenuation adjustment for switching at least two wavelength channels to the blocking state is implemented by using a same image, so that the at least two wavelength channels can be simultaneously switched to the blocking state, to avoid frequent power fluctuation that is of a multiplexing optical signal and that is caused by switching the at least two wavelength channels to the blocking state at different moments, improve accuracy of power control of an optical component at a back end of a network, improve operating stability of a non-scheduling service, and improve WSS performance.

In an implementation, the optical switching element includes a liquid crystal on silicon LCOS. In this case, the LCOS includes X pixels, and the image is a set of phase states of all of the X pixels, where X is a positive integer.

In this application, "attenuation adjustment" may be understood as adjustment performed on an attenuation value, and "attenuation adjustment" may include "segment-based attenuation adjustment". Specifically, a process of switching an original port of an optical channel from a normal state to a blocking state (in other words, switching an image presented by the optical switching element from an original image to a target image) may include a process of adjusting the attenuation value for a plurality of times, or may be implemented through one or more transition images.

It should be understood that the foregoing listed specific form of the optical switching element is merely an example for description, and this application is not limited thereto. For example, the optical switching element may further include a micro-electro-mechanical system (Micro-Electro-Mechanical System, MEMS). In this case, the MEMS includes Y micromirrors, and the image is a set of angle states of all of the Y micromirrors, where Y is a positive integer.

In this application, the at least two wavelength channels are in one-to-one correspondence with at least two wavelengths, and each wavelength channel is a channel of an optical signal with a corresponding wavelength.

Center frequencies of any two of the at least two wavelengths are different.

In this application, a "normal state" of a wavelength channel may be understood as a state of the wavelength channel when an optical signal in the wavelength channel is normally transmitted, for example, an attenuation value and an input/output port of the wavelength channel when the optical signal in the wavelength channel is normally transmitted.

In this application, state switching of a wavelength channel may include, but not limited to, the following processes:

Process 1: The wavelength channel is switched from a normal state to a blocking state.

Process 2: An input or output port of the wavelength channel is switched from one port (for example, a port a) to another port (for example, a port b). Specifically, the process may include that the port a is switched from the normal state to the blocking state, and the port b is switched from the blocking state to the normal state.

Alternatively, in this application, the at least two wavelength channels (for example, the first wavelength channel and the second wavelength channel) include a wavelength channel that needs to perform the foregoing process 1 and/or a wavelength channel that needs to perform the foregoing process 2.

That is, in this application, state switching processes of the at least two wavelength channels (for example, the first wavelength channel and the second wavelength channel) each include a process of switching from the normal state to the blocking state.

In this case, in this application, each of the K images includes at least two sub-images, the at least two sub-images are in one-to-one correspondence with the at least two wavelength channels (specifically, the at least two wavelength channels whose state switching processes each include the process of switching from the normal state to the blocking state), and each sub-image is used for attenuation adjustment (specifically, one or more times of attenuation adjustment performed for switching from the normal state to the blocking state) on a corresponding wavelength channel, or each sub-image indicates an attenuation value of the corresponding wavelength channel.

For example, assuming that the optical switching element performs state switching of M wavelength channels, where M≥2, a $j^{th}$ image in the K images includes M sub-images, the M wavelength channels are in one-to-one correspondence with the M sub-images, where j∈[1, K], and an $m^{th}$ sub-image in the $j^{th}$ image indicates an attenuation value to which an $m^{th}$ wavelength channel needs to be adjusted at a moment corresponding to the $j^{th}$ image.

It should be noted that the attenuation value indicated by the $m^{th}$ sub-image in the $j^{th}$ image may be the same as or different from an attenuation value indicated by an $m^{th}$ sub-image in a $(j-1)^{th}$ (or $(j+1)^{th}$) image.

When the attenuation value indicated by the $m^{th}$ sub-image in the $j^{th}$ image is different from the attenuation value indicated by the $m^{th}$ sub-image in the $(j-1)^{th}$ image, it indicates that an attenuation value of the $m^{th}$ wavelength channel needs to be adjusted at a moment corresponding to the $(j-1)^{th}$ image. Specifically, the attenuation value of the $m^{th}$ wavelength channel needs to be adjusted from the attenuation value indicated by the $m^{th}$ sub-image in the $(j-1)^{th}$ image to the attenuation value indicated by the $m^{th}$ sub-image in the $j^{th}$ image.

When the attenuation value indicated by the $m^{th}$ sub-image in the $j^{th}$ image is the same as the attenuation value indicated by the $m^{th}$ sub-image in the $(j-1)^{th}$ image, it indicates that an attenuation value of the $m^{th}$ wavelength channel does not need to be adjusted at a moment corresponding to the $(j-1)^{th}$ image, or indicates that the attenuation value of the $m^{th}$ wavelength channel is adjusted by an amount of 0 at the moment corresponding to the $(j-1)^{th}$ image.

In addition, in this application, the attenuation value indicated by the $m^{th}$ sub-image in the $j^{th}$ image may be the same as or different from an attenuation value indicated by an $n^{th}$ sub-image in the $j^{th}$ image. This is not particularly limited in this application, where m≠n.

In an implementation, the first wavelength channel includes a wavelength channel, in the at least two wavelength channels, with a quantity of times that attenuation adjustment is performed for switching from the normal state to the blocking state being greater than or equal to a first threshold.

By way of example but not limitation, the first wavelength channel includes a wavelength channel, in the at least two wavelength channels, with a largest quantity of times that attenuation adjustment is performed for switching from the normal state to the blocking state.

In this way, light scattering caused by excessively large attenuation adjustment performed each time can be reduced, thereby further improving accuracy of power control of an optical component at a back end of a network.

It should be noted that a specific object of the first wavelength channel listed above is merely an example for description, and this application is not particularly limited. The first wavelength channel may be any wavelength channel, in the at least two wavelength channels, with a quantity of times that attenuation adjustment is performed for switching from the normal state to the blocking state being greater than or equal to 2.

In an implementation, there may be one second wavelength channel.

In another implementation, there may be a plurality of second wavelength channels, to be specific, the second wavelength channels include a plurality of (for example, some or all of) wavelength channels, in the at least two wavelength channels, whose switching states are from the normal state to the blocking state.

Attenuation adjustment for switching to the blocking state is performed, through a same image, on each of the plurality of wavelength channels that need to be switched from the normal state to the blocking state, to further reduce frequent power fluctuation of a multiplexing optical signal, and further improve accuracy of power control of an optical component at a back end of a network.

In this application, in the K images, an image used to perform attenuation adjustment on the first wavelength channel for the first time is different from an image used to perform attenuation adjustment on the second wavelength channel for the first time.

Alternatively, a moment at which attenuation adjustment is performed on the first wavelength channel for the first time (that is, an attenuation value changes for the first time) is different from a moment at which attenuation adjustment is performed on the second wavelength channel for the first time.

In other words, in this application, the plurality of wavelength channels that need to be switched from the normal state to the blocking state include at least two wavelength channels on which first time of attenuation adjustment is not performed through a same image.

In this application, the image used to perform attenuation on the first wavelength channel for the first time is the $1^{st}$ image in the K images.

In an implementation, the image used to perform attenuation on the second wavelength channel for the first time is an image following the $1^{st}$ image in the K images.

For example, the image used to perform attenuation on the second wavelength channel for the first time is a $t^{th}$ image in the K images, where t≥2.

In this case, in the $1^{st}$ image to a $(t-1)^{th}$ image in the K images, sub-images corresponding to the second wavelength channel are the same.

In other words, in the $1^{st}$ image to the $(t-1)^{th}$ image in the K images, attenuation values indicated by the sub-images corresponding to the second wavelength channel are the same.

In other words, the first wavelength channel and the second wavelength channel are switched to the blocking state through the first image in the K images, and second sub-images in at least two consecutive images that are in the K images and that precede the first image are the same.

In an implementation, the K images are in one-to-one correspondence with boundaries of K attenuation ranges, and each of the K images is used for cross-region attenuation adjustment on at least one wavelength channel in attenuation ranges at two sides of a boundary corresponding to the image.

For example, an attenuation boundary corresponding to a $k^{th}$ image in the K images is b, and attenuation ranges on two sides of the boundary are [a, b) and [b, c), where a, b, and c represent three attenuation values in descending order.

Therefore, the $k^{th}$ image is used in a process of cross-region attenuation adjustment on (at least two) wavelength channels, in the at least two wavelength channels, whose attenuation values each need to be adjusted from an attenuation value e to an attenuation value f, where e∈[a, b), and f∈[b, c).

A process of attenuation adjustment on a plurality of wavelength channels whose attenuation values each need to be adjusted from one attenuation range to another attenuation range is performed through a same image, so that accuracy of power control of an optical component at a back end of a network can be further improved.

In an implementation, the at least two wavelength channels further include a third wavelength channel, and the method further includes: generating L images that are consecutive in time sequence, where a value of L depends on a quantity of times that attenuation adjustment is performed for switching the third wavelength channel from the blocking state to the normal state, the first wavelength channel and the second wavelength channel are switched to the blocking state through a first image in the K images, and the $1^{st}$ image in the L images follows the first image in time sequence; and sending information about the L images to the optical switching element, to enable the optical switching element to perform attenuation adjustment on the third wavelength channel.

Alternatively, the method further includes: determining an opening moment of the third wavelength channel based on the blocking moment of the first wavelength channel, and generating L images that are consecutive in time sequence, where a value of L depends on a quantity of times that attenuation adjustment is performed for switching the third wavelength channel (specifically, a destination port of the third wavelength channel) from the blocking state to the normal state, and the opening moment of the third wavelength channel is later than the blocking moment of the first wavelength channel; and sending information about the L images to the optical switching element, to enable the optical switching element to perform attenuation adjustment on the third wavelength channel. That is, state switching (on the basis of including the foregoing process 1 and/or process 2) of a wavelength channel in this application may further include the following process:

Process 3: The wavelength channel (or a port of the wavelength channel) is switched from the blocking state to the normal state.

That is, in this application, state switching of at least one wavelength channel (for example, the third wavelength channel) may include a process of switching from the normal state to the blocking state.

In other words, in this application, the at least one wavelength channel (for example, the third wavelength channel) includes a wavelength channel that needs to perform the foregoing process 3.

According to this solution of this application, an image used to switch a long channel to an opening state follows, in time sequence, an image used to switch the long channel to the blocking state, so that frequent power fluctuation of a multiplexing optical signal can be further avoided, thereby improving accuracy of power control of an optical component at a back end of a network, improving operating stability of a non-scheduling service, and improving WSS performance.

In this case, in this application, each of the L images includes at least one sub-image, the at least one sub-image is in one-to-one correspondence with at least one wavelength channel (specifically, at least one wavelength channel whose state switching process includes a process of switching from the blocking state to the normal state), and each sub-image is used for attenuation adjustment (specifically, one or more times of attenuation adjustment performed for switching from the blocking state to the normal state) on a corresponding wavelength channel, or each sub-image indicates an attenuation value of the corresponding wavelength channel.

For example, assuming that the optical switching element performs state switching of M wavelength channels, where M≥2, a $j^{th}$ image in the L images includes M sub-images, the M wavelength channels are in one-to-one correspondence with the M sub-images, where j∈[1, L], and an $m^{th}$ sub-image in the $j^{th}$ image indicates an attenuation value to which an $m^{th}$ wavelength channel needs to be adjusted at a moment corresponding to the $j^{th}$ image.

It should be noted that the attenuation value indicated by the $m^{th}$ sub-image in the $j^{th}$ image may be the same as or different from an attenuation value indicated by an $m^{th}$ sub-image in a $(j-1)^{th}$ (or $(j+1)^{th}$) image.

When the attenuation value indicated by the $m^{th}$ sub-image in the $j^{th}$ image is different from the attenuation value indicated by the $m^{th}$ sub-image in the $(j-1)^{th}$ image, it indicates that an attenuation value of the $m^{th}$ wavelength channel needs to be adjusted at a moment corresponding to the $(j-1)^{th}$ image. Specifically, the attenuation value of the $m^{th}$ wavelength channel needs to be adjusted from the attenuation value indicated by the $m^{th}$ sub-image in the $(j-1)^{th}$ image to the attenuation value indicated by the $m^{th}$ sub-image in the $j^{th}$ image.

When the attenuation value indicated by the $m^{th}$ sub-image in the $j^{th}$ image is the same as the attenuation value indicated by the $m^{th}$ sub-image in the $(j-1)^{th}$ image, it indicates that an attenuation value of the $m^{th}$ wavelength channel does not need to be adjusted at a moment corresponding to the $(j-1)^{th}$ image, or indicates that the attenuation value of the $m^{th}$ wavelength channel is adjusted by an amount of 0 at the moment corresponding to the $(j-1)^{th}$ image.

In addition, in this application, the attenuation value indicated by the $m^{th}$ sub-image in the $j^{th}$ image may be the same as or different from an attenuation value indicated by an $n^{th}$ sub-image in the $j^{th}$ image. This is not particularly limited in this application, where m≠n.

In an implementation, the third wavelength channel includes a wavelength channel, in the at least two wavelength channels, with a largest quantity of times that attenuation adjustment is performed for switching from the blocking state to the normal state.

In this way, light scattering caused by excessively large attenuation adjustment performed each time can be reduced, thereby further improving accuracy of power control of an optical component at a back end of a network.

It should be noted that a specific object of the third wavelength channel listed above is merely an example for description, and this application is not particularly limited. The third wavelength channel may be any wavelength channel, in the at least two wavelength channels, with a quantity of times that attenuation adjustment is performed for switching from the blocking state to the normal state being greater than or equal to 2.

In an implementation, there may be one third wavelength channel.

In another implementation, there may be a plurality of third wavelength channels, to be specific, the third wavelength channels include a plurality of (for example, some or all of) wavelength channels, in the at least two wavelength channels, whose switching states are from the blocking state to the normal state.

In an implementation, the L images are in one-to-one correspondence with boundaries of L attenuation ranges, and each of the L images is used for cross-region attenuation adjustment on at least one wavelength channel in attenuation ranges at two sides of a boundary corresponding to the image.

For example, attenuation ranges corresponding to a $v^{th}$ image in the L images are [p, q) to [q, r), where p, q, and r represent three attenuation values in ascending order.

Therefore, the $v^{th}$ image is used in a process of attenuation adjustment on (at least one) wavelength channel, in the at least two wavelength channels, whose attenuation value needs to be adjusted from an attenuation value s to an attenuation value t, where s∈[p, q), and t∈[q, r).

According to a second aspect, an optical switching method is provided, and applied to an optical switching element including at least two wavelength channels, where the at least two wavelength channels include a first wavelength channel and a second wavelength channel, and the method includes:

obtaining K images that are consecutive in time sequence, where the first wavelength channel and the second wavelength channel are switched to a blocking state through a same image in the K images, K is an integer greater than or equal to 2, a value of K depends on a quantity of times that attenuation adjustment is performed for switching the first wavelength channel from a normal state to the blocking state, each of the K images includes a first sub-image and a second sub-image, the first sub-image indicates an attenuation adjustment value of the first wavelength channel, and the second sub-image indicates an attenuation adjustment value of the second wavelength channel; and performing attenuation adjustment on the first wavelength channel and the second wavelength channel based on the K images.

For example, "obtaining K images that are consecutive in time sequence" may be understood as that the optical switching element receives the K images from an external device (for example, a device for generating the K images). In other words, the external device may send the K images to the optical switching element.

For another example, "obtaining K images that are consecutive in time sequence" may be understood as that the optical switching element reads the K images from an external device (for example, a device for generating the K images). For example, the external device may store the generated K images in preset storage space, and the optical switching element may read the K images from the storage space.

A blocking moment of the second wavelength channel is determined based on a blocking moment of the first wavelength channel, and the blocking moment of the second wavelength channel is the same as the blocking moment of the first wavelength channel.

In an implementation, the first wavelength channel includes a wavelength channel, in the at least two wavelength channels, with a quantity of times that attenuation adjustment is performed for switching from the normal state to the blocking state being greater than or equal to a first threshold.

By way of example but not limitation, the first wavelength channel includes a wavelength channel, in the at least two wavelength channels, with a largest quantity of times that attenuation adjustment is performed for switching from the normal state to the blocking state.

The second wavelength channel includes a plurality of wavelength channels, in the at least two wavelength channels, whose switching states are from the normal state to the blocking state.

For example, in the K images, an image used to perform attenuation adjustment on the first wavelength channel for the first time is different from an image used to perform attenuation adjustment on the second wavelength channel for the first time.

Alternatively, the image used to perform attenuation on the second wavelength channel for the first time is an image following the $1^{st}$ image in the K images.

The K images are in one-to-one correspondence with K attenuation ranges, and each of the K images is used for attenuation adjustment on at least one wavelength channel in an attenuation range corresponding to the image.

In an implementation, the at least two wavelength channels further include a third wavelength channel, and the method further includes: receiving L images that are consecutive in time sequence, where L is an integer greater than or equal to 1, a value of L depends on a quantity of times that attenuation adjustment is performed for switching the third wavelength channel from the blocking state to the normal state, the first wavelength channel and the second wavelength channel are switched to the blocking state through a first image in the K images, and the $1^{st}$ image in the L images follows the first image in time sequence; and performing attenuation adjustment on the third wavelength channel based on the L images.

An opening moment of the third wavelength channel is determined based on the blocking moment of the first wavelength channel, and the opening moment of the third wavelength channel is later than the blocking moment of the first wavelength channel.

The L images are in one-to-one correspondence with L attenuation ranges, and each of the L images is used for attenuation adjustment on at least one wavelength channel in an attenuation range corresponding to the image.

For example, the optical switching element includes a liquid crystal on silicon LCOS.

In this case, the LCOS includes M pixels, and the image is a set of phase states of all of the M pixels.

According to a third aspect, a processing apparatus is provided, and includes modules or units configured to perform the method in any one of the first aspect or the possible implementations of the first aspect.

According to a fourth aspect, a processing apparatus is provided, and includes modules or units configured to perform the method in any one of the second aspect or the possible implementations of the second aspect.

According to a fifth aspect, a processing apparatus is provided, and includes a processor. The processor is coupled to a memory, and may be configured to perform the method in the first aspect and the possible implementations of the first aspect. Optionally, the processing apparatus further includes a memory. Optionally, the processing apparatus further includes a communication interface, and the processor is coupled to the communication interface.

In an implementation, the processing apparatus is a processing device. In this case, the communication interface may be a transceiver or an input/output interface. In another implementation, the processing apparatus is a chip or a chip system. In this case, the communication interface may be an input/output interface, an interface circuit, an output circuit, an input circuit, a pin, a related circuit, or the like on the chip or the chip system. The processor may alternatively be embodied as a processing circuit or a logic circuit.

According to a sixth aspect, a processing apparatus is provided, and includes a processor. The processor is coupled to a memory, and may be configured to perform the method in the second aspect and the possible implementations of the second aspect. Optionally, the processing apparatus further includes a memory. Optionally, the processing apparatus further includes a communication interface, and the processor is coupled to the communication interface.

In an implementation, the processing apparatus is a processing device. In this case, the communication interface may be a transceiver or an input/output interface. In another implementation, the processing apparatus is a chip or a chip system. In this case, the communication interface may be an input/output interface, an interface circuit, an output circuit, an input circuit, a pin, a related circuit, or the like on the chip or the chip system. The processor may alternatively be embodied as a processing circuit or a logic circuit.

According to a seventh aspect, a processing apparatus is provided, and includes an input circuit, an output circuit, and a processing circuit. The processing circuit is configured to, receive a signal through the input circuit, and transmit a signal through the output circuit, so that the method in any one of the first aspect and the possible implementations of the first aspect is implemented.

In a specific implementation process, the processing apparatus may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be different circuits, or may be a same circuit. In this case, the circuit is used as the input circuit and the output circuit at different moments. Specific implementations of the processor and the circuits are not limited in embodiments of this application.

According to an eighth aspect, a processing apparatus is provided, and includes an input circuit, an output circuit, and a processing circuit. The processing circuit is configured to: receive a signal through the input circuit, and transmit a signal through the output circuit, so that the method in any one of the second aspect and the possible implementations of the second aspect is implemented.

In a specific implementation process, the processing apparatus may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be different circuits, or may be a same circuit. In this case, the circuit is used as the input circuit and the output circuit at different moments. Specific implementations of the processor and the circuits are not limited in embodiments of this application.

According to a ninth aspect, a processing apparatus is provided, and includes a processor and a memory. The processor is configured to: read instructions stored in the memory, receive a signal through a receiver, and transmit a signal through a transmitter, to perform the method in the first aspect or the second aspect and the possible implementations of the first aspect or the second aspect.

Optionally, there are one or more processors and one or more memories.

Optionally, the memory may be integrated into the processor, or the memory and the processor are separately disposed.

During specific implementation, the memory may be a non-transitory (non-transitory) memory, for example, a read-only memory (read-only memory, ROM). The memory and the processor may be integrated on a same chip, or may be separately disposed on different chips. A type of the memory and a manner of disposing the memory and the processor are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may be from a receiver. The transmitter and the receiver may be collectively referred to as a transceiver.

The processor in the ninth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently outside the processor.

According to a tenth aspect, a processing apparatus is provided, and includes a communication interface and a processing circuit. The communication interface is configured to send an image according to the method in any one of the first aspect and the possible implementations of the first aspect, and the processing circuit is configured to generate the image.

According to an eleventh aspect, a processing apparatus is provided, and includes a communication interface and a processing circuit. The communication interface is configured to obtain an image, and the processing circuit is configured to control an optical switching element by using the image according to the method in any one of the second aspect and the possible implementations of the second aspect.

According to a twelfth aspect, a computer program product is provided. The computer program product includes a computer program (which may also be referred to as code or an instruction). When the computer program is run, a computer is enabled to perform the method in any one of the first aspect or the second aspect and the possible implementations of the first aspect or the second aspect.

According to a thirteenth aspect, a computer-readable medium is provided. The computer-readable medium stores a computer program (which may also be referred to as code or an instruction). When the computer program is run on a computer, the computer is enabled to perform the method in the first aspect or the second aspect and the possible implementations of the first aspect or the second aspect.

According to a fourteenth aspect, a liquid crystal on silicon LCOS is provided, and includes: a liquid crystal display, including a plurality of pixels, where phase states of the plurality of pixels are adjustable; an interface, configured to obtain K images that are consecutive in time sequence, where a first wavelength channel and a second wavelength channel are switched to a blocking state through a same image in the K images, K is an integer greater than or equal to 2, a value of K depends on a quantity of times that attenuation adjustment is performed for switching the first wavelength channel from a normal state to the blocking state, each of the K images includes a first sub-image and a second sub-image, the first sub-image indicates an attenuation adjustment value of the first wavelength channel, and the second sub-image indicates an attenuation adjustment value of the second wavelength channel; and a controller, configured to control the phase states of the plurality of pixels of the liquid crystal display based on the K images, to perform attenuation adjustment on the first wavelength channel and the second wavelength channel.

In addition, the LCOS is further configured to perform the method in any possible implementation of the second aspect.

According to a fifteenth aspect, a liquid crystal on silicon LCOS is provided, and includes: a liquid crystal display, including a plurality of pixels, where phase states of the plurality of pixels are adjustable; a first controller, configured to generate K images that are consecutive in time sequence, where a first wavelength channel and a second wavelength channel are switched to a blocking state through a same image in the K images, K is an integer greater than or equal to 2, a value of K depends on a quantity of times that attenuation adjustment is performed for switching the first wavelength channel from a normal state to the blocking state, each of the K images includes a first sub-image and a second sub-image, the first sub-image indicates an attenuation adjustment value of the first wavelength channel, and the second sub-image indicates an attenuation adjustment value of the second wavelength channel; and a second controller, configured to control the phase states of the plurality of pixels of the liquid crystal display based on the K images, to perform attenuation adjustment on the first wavelength channel and the second wavelength channel.

In addition, the LCOS is further configured to perform the method in any possible implementation of the first aspect.

In addition, the LCOS is further configured to perform the method in any possible implementation of the second aspect.

According to a sixteenth aspect, a wavelength selective switch WSS is provided, and includes: an input port, configured to input an optical signal, where the optical signal has a plurality of wavelength channels; the LCOS according to the fourteenth aspect or the fifteenth aspect, configured to perform attenuation adjustment on at least two wavelength channels in the optical signal, where the at least two wavelength channels include a first wavelength channel and a second wavelength channel; and an output port, configured to output an optical signal on which attenuation adjustment has been performed.

According to a seventeenth aspect, a reconfigurable optical add-drop multiplexer is provided, and includes a demultiplexing module and a multiplexing module, where the demultiplexing module is configured to drop a first optical wavelength signal from a station; the multiplexing module is configured to receive a second optical wavelength signal added by the station; and the demultiplexing module and/or the multiplexing module are/is the wavelength selective switch in the sixteenth aspect.

DESCRIPTION OF EMBODIMENTS

The following describes technical solutions in this application with reference to the accompanying drawings.

The technical solutions of this application may be applied to fields such as an optical communication network, an optical switching network, and a digital center network. For example, the technical solutions may be used in optical switching apparatuses (or optical switching structures) in these fields, for example, components of a reconfigurable optical add-drop multiplexer (reconfigurable optical add-drop multiplexer, ROADM) and an optical cross-connect (optical cross-connect, OXC) device, for example, a WSS apparatus.

Figure 1:
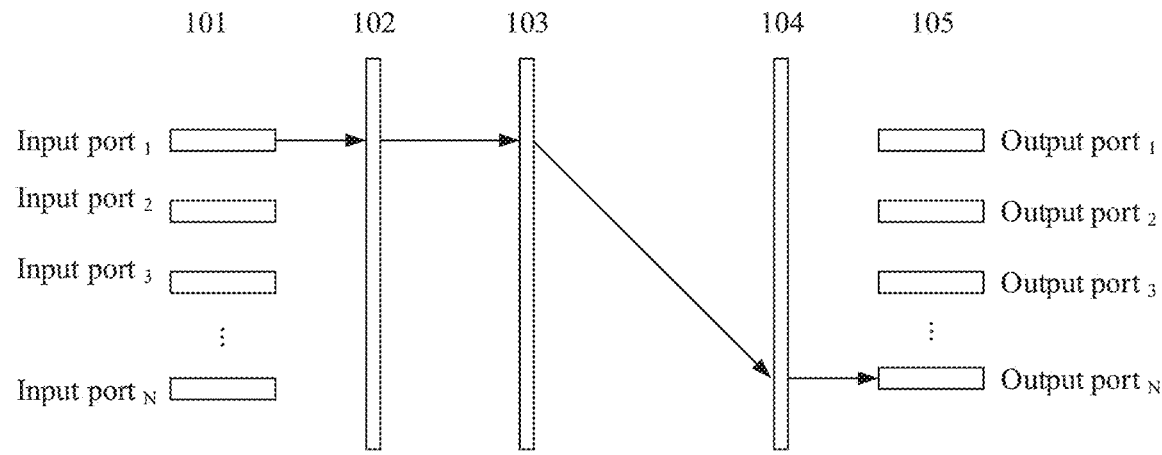
FIG. 1 is a schematic front view of a WSS apparatus applicable to the solution of this application.
Figure 2:
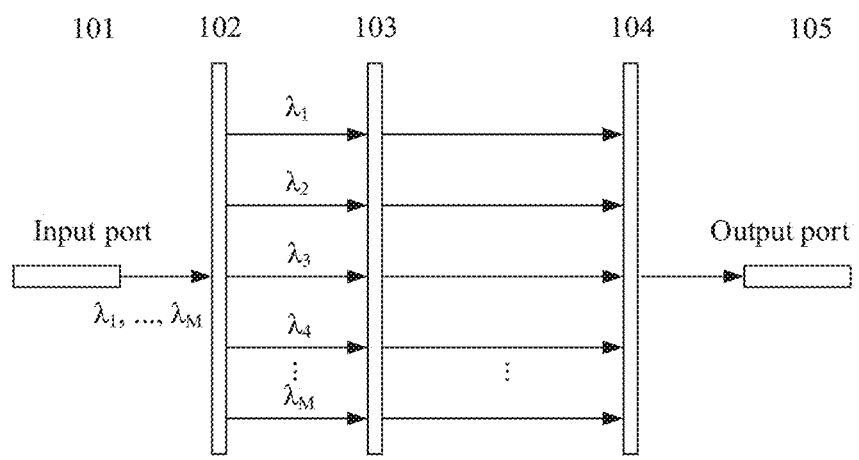
FIG. 2 is a schematic top view of a WSS apparatus applicable to the solution of this application.

FIG. 1 and FIG. 2 each show a structure of an N×N WSS apparatus. As shown in FIG. 1, the WSS apparatus has N input ports and N output ports, and can implement any paired all-optical connections between the input ports and the output ports. In other words, an optical signal with any wavelength in the N input ports may be output from any one of the N output ports. It should be understood that in FIG. 1, a quantity of input ports and a quantity of output ports are equal, and both are N. This is merely used as an example for description. During specific implementation, the quantity of input ports and the quantity of output ports may be unequal, for example, may be 1×N and N×Z, where both N and Z are positive integers.

Specifically, main components of the WSS apparatus include an input port 101, a demultiplexer 102, an optical switching element 103, a multiplexer 104, and an output port 105.

As shown in FIG. 1 and FIG. 2, the input port 101 is configured to input a multi-wavelength signal. The multi-wavelength signal includes a plurality of (for example, M) wavelengths, that is, $\lambda_1$ to $\lambda_M$. The demultiplexer 102 is configured to decompose the multi-wavelength signal into single-wavelength signals of the M wavelengths. The optical switching element 103 is configured to switch an optical path of each single-wavelength signal to a corresponding output port 105. The multiplexer 104 is configured to multiplex a plurality of single-wavelength signals that are switched to a same output port, and then output the multiplexed wavelength signals from the output port 105, to implement optical signal switching. The demultiplexer 102 may be a reflection grating, a transmission grating, a dispersion prism, or a planar waveguide grating. In addition, to enhance a dispersion effect, a combination of a plurality of gratings may be used, or an optical path may be adjusted, so that target signal light passes through a same grating for a plurality of times.

It should be understood that the structure of the WSS shown in each of FIG. 1 and FIG. 2 is merely an example for description, and this application is not limited thereto. For example, there may alternatively be two optical switching elements 103. In addition, the WSS may further include an optical path changing component such as a lens or a reflector.

By way of example but not limitation, the optical switching element 103 in this application may be implemented by using any one of the following technologies.

For example, the optical switching element may be implemented by using a micro-electro-mechanical system (MEMS, Micro-Electro-Mechanical System) technology. In the MEMS technology, a micro-electro-mechanical apparatus and a control circuit whose geometric sizes or operation sizes are in an order of magnitude of only micron, submicron, or even nanometer are highly integrated into very small space on a silicon-based or non-silicon-based material, to constitute an electromechanical integrated component or system. The optical switching element implemented by using the MEMS technology enables, by an electrostatic force or another control force, a micro reflector to mechanically move, so that light that is cast on the micro reflector deflects to any direction. When the optical switching element in the present invention is implemented by using the MEMS technology, a controller may control a micromechanical structure by using a control instruction, to drive an optical modulator (a microlens) to rotate, so as to implement deflection of the optical path, and then implement switching of a dimension (or a transmission path) of signal light.

For another example, the optical switching element may be implemented by using a liquid crystal (LC, liquid crystal) technology. In the optical switching element implemented by using the LC technology, after passing through a birefringent crystal, incident signal light is split to be in two polarization states. After one path of light passes through a half-wave plate, two paths of light have a same polarization state, and then the light is cast on the optical switching element (a liquid crystal module). A voltage of the birefringent crystal is adjusted to change an arrangement structure of the liquid crystal (change angles of molecules in the crystal). In this way, a refractive index of the crystal changes, and a light source outputs light at different angles. After the light passes through each liquid crystal layer, two directions may be selected, and after the light passes through a plurality of liquid crystal layers, a plurality of optical paths may be selected.

For another example, in embodiments of the present invention, the optical switching element may be implemented by using a digital light processing (DLP, Digital Light Processing) technology. An internal structure of the optical switching element implemented by using the DLP technology is similar to an internal structure of the optical modulator implemented by using the MEMS technology, and optical energy is switched through deflection of the microlens. A difference is that, a DLP microlens has only several rotation angles, and this limits a quantity of output ports.

For another example, the optical switching element may be implemented by using a liquid crystal on silicon (LCoS, Liquid Crystal On Silicon) technology. In the LCoS (or LCOS) technology, a liquid crystal grating principle is used to adjust optical reflection angles of different wavelengths, to achieve an objective of separating light. The LCoS technology is highly reliable due to absence of movable parts. In the LCoS technology, a refractive index change of a liquid crystal unit is controlled to implement a reflection angle change, so that expansion and upgrade can be easily implemented. Different channels correspond to different regions of a spatial optical modulator (liquid crystal) array, and a transmission direction of light is changed by adjusting a phase of an optical spot, achieving an objective of switching between different ports and attenuation adjustment.

For ease of understanding and description, the following describes the solutions of this application in detail by using an example in which an LCoS is used as an optical switching element.

Figure 3:
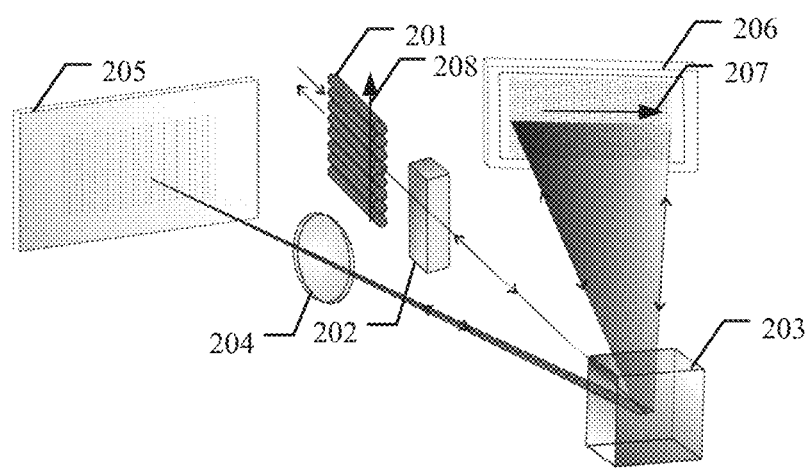
FIG. 3 is a schematic three-dimensional diagram of a WSS apparatus applicable to the solution of this application.

FIG. 3 is a schematic diagram of an example of a structure of a WSS according to this application. As shown in FIG. 1, the WSS includes a plurality of ports 201 that are used as input ports or output ports of optical signals. After an incident optical signal enters the WSS from the input port, the incident optical signal first needs to be split, by a crystal or a polarization beam splitter (polarization beam splitter, PBS) 202, into two beams of light whose polarization states are orthogonal, and then the polarization state of one of the two beams is rotated, so that the polarization states of the two beams are aligned with an operating polarization state of an LCOS 206. If a polarization-independent LCOS 206 is used, no crystal or polarization beam splitter 202 is required. A polarization-converted optical signal is incident onto a periodic grating 205 (namely, an example of the demultiplexer 102) through a lens 204. The periodic grating 205 is a dispersion element, and the periodic grating 205 is configured to: decompose the optical signal into optical signals having different wavelengths, and transmit the optical signals to the LCOS 206 (namely, an example of the optical switching element 103). A grating formed in the LCOS 206 is different from the periodic grating 205. The periodic grating 205 is a physical entity, and the grating formed in the LCOS 206 is an equivalent grating. Optical signals having different wavelengths are emitted from the periodic grating 205 at different angles, and are incident to different regions of the LCOS 206 after passing through the lens 204. Gray distribution of gratings in different regions of the LCOS 206 is adjusted, so that a corresponding wavelength can be controlled to implement angle deflection in a port direction 208 that is perpendicular to a wavelength direction 207, and an optical signal on which angle deflection is performed is incident to a Fourier lens 203. The Fourier lens 203 performs location shifting on the optical signal, and the optical signal on which location shifting is performed is coupled to a specific output port. Gray distribution of gratings in one region of the LCOS 206 is controlled, so that optical signals that are incident to the region can be output from different output ports.

The LCOS 206 may also be referred to as an LCOS array, and includes a plurality of pixels. Each pixel can be independently adjusted. A reflection angle and reflection intensity of the pixel at an illumination wavelength can be adjusted by controlling a liquid crystal phase in the pixel, to implement scheduling or switching of a wavelength port that can be controlled by software. In the industry, a set of states of all pixels in the LCOS array is generally referred to as an LCOS image, that is, an LCOS image determines a result of applying, by the WSS, allocation and attenuation on all incident wavelength ports.

Figure 4:
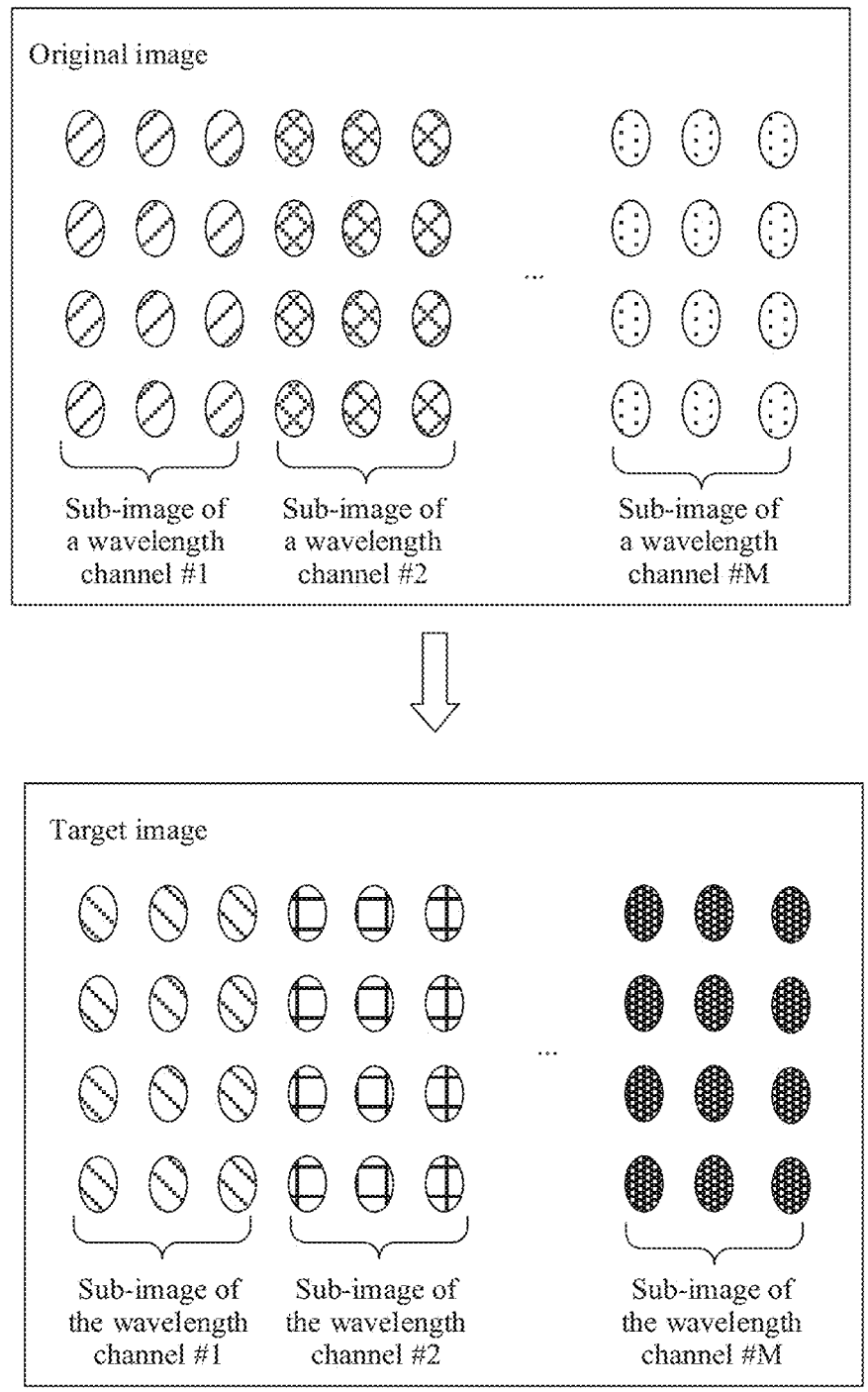
FIG. 4 is a schematic diagram of an example of a port switching principle of a wavelength channel of an LCOS.

Dynamic wavelength switching is essentially to control the LCOS in the WSS to implement a directional image change. As shown in FIG. 4, a simple implementation solution is to control the LCOS to directly change from an original image (an original switching state) to a target image (a target switching state). A phase of each pixel in the LCOS and an operating voltage of the LCOS that are required for implementing the target switching state are obtained by a processor through calculation based on factory calibration data of a component.

However, phase transformation of the LCOS has hysteresis, and a phase of an intermediate state is uncontrollable in a process of initial and final phase transformation. In the foregoing point-to-point direct change solution, the uncontrollable phase of the intermediate state causes scattering of an incident wavelength in a switching state change process. As a result, power control of an optical component at a back end of a network is inaccurate, that is, transient port isolation (Transient Port Isolation, TPI) performance is poor. Because inaccurate power control of the optical component at the back end of the network causes service performance fluctuation and even service interruption, this solution is also referred to as a hit (Hit) switching mode.

Figure 5:
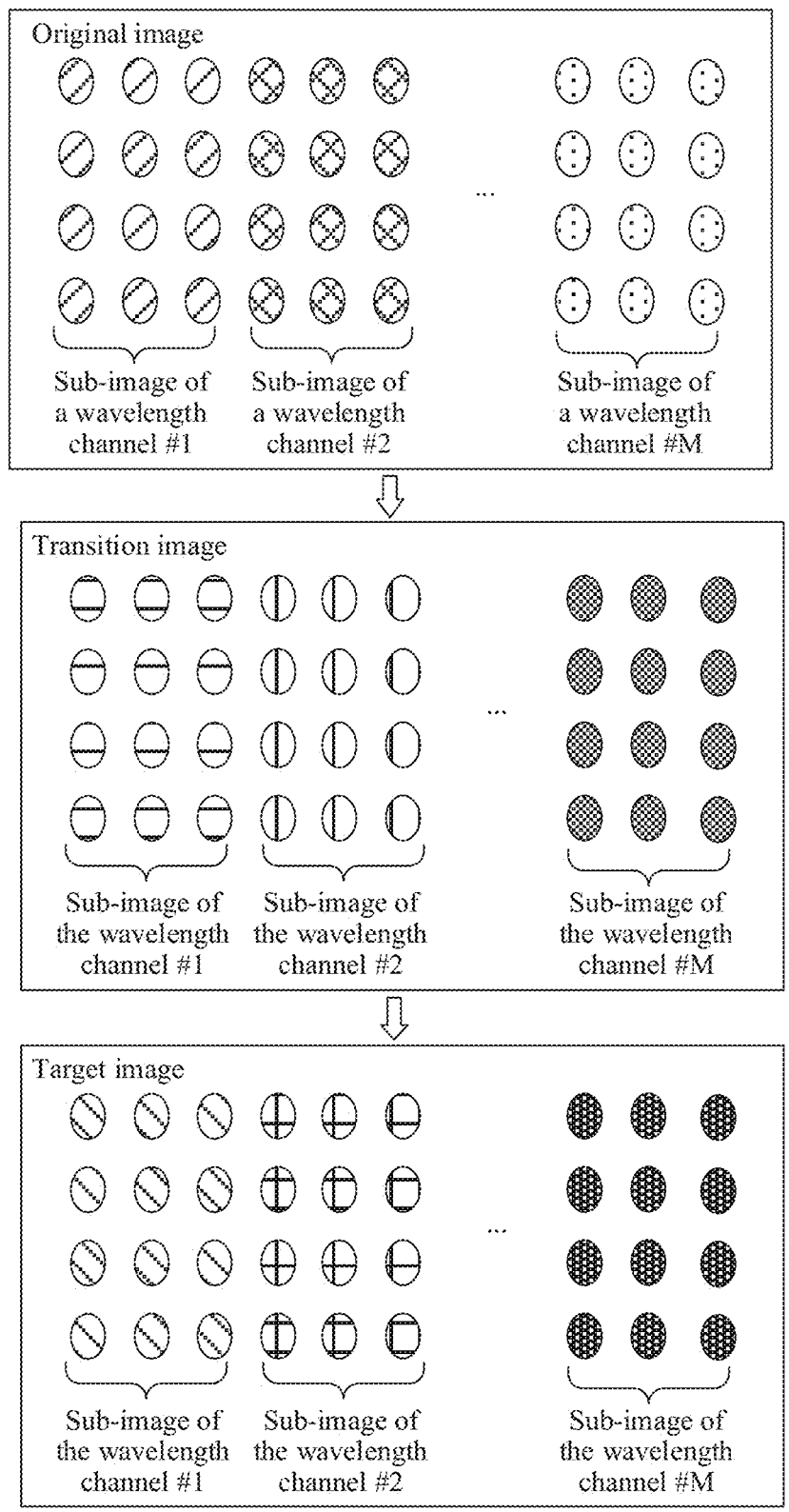
FIG. 5 is a schematic diagram of another example of a port switching principle of a wavelength channel of an LCOS.

To improve TPI performance in the switching state change process, a hitless (Hitless) switching mode is proposed. To be specific, one or more transition images are inserted between the original image and the target image. A switching state change procedure thereof is shown in FIG. 5. The transition image is selected (usually set through channel attenuation) according to a physical change rule of an uncontrollable phase of a liquid crystal. A random large scattering phase can be effectively avoided by using a preset transition phase, and it is ensured that TPI performance in the switching change process can meet an application requirement. This solution provided in this application can be effectively applied to the foregoing hitless switching mode.

It should be noted that the term "image" in this application may be understood as information used to control an optical switching element (for example, control a process of adjusting an attenuation value of a wavelength channel by the optical switching element). For example, when the optical switching element is an LCOS or an LC, the "image" may be understood as a set of states of all pixels in the LCOS array. For another example, when the optical switching element is an MEMS or DLP, the "image" may be understood as a set of angle states of all micro reflectors on a micro reflector array. For ease of understanding and description, the "image" is referred to as a "control image" below.

This solution provided in this application is applicable to the foregoing "control image" generation process. The optical switching element adjusts attenuation of the wavelength channel based on the "control image" generated in the manner provided in this application, so that accuracy of power control of the optical component at the back end of the network can be effectively improved.

As shown in FIG. 4 and FIG. 5, assuming that the control image is used to change port states of M wavelength channels, the control image includes M sub-images, each sub-image includes a plurality of pixels, the M sub-images are in one-to-one correspondence with the M wavelength channels, and each sub-image is used to change a port state of a corresponding wavelength channel. Pixel states of the plurality of pixels included in each sub-image may be used to control attenuation of the corresponding wavelength channel, to control a state of each wavelength channel (for example, a process of switching between an opening state and a blocking state). For example, a sub-image of a wavelength channel #1 is used to control an attenuation value of the wavelength channel #1, a sub-image of a wavelength channel #2 is used to control an attenuation value of the wavelength channel #2, . . . , and a sub-image of a wavelength channel #M is used to control an attenuation value of the wavelength channel #M.

For example, when a port of the wavelength channel #1 needs to be switched from a port #1 to a port #2, an attenuation value of the port #1 (specifically, an attenuation value of the wavelength channel #1 at the port #1) may be adjusted to block the port #1, and an attenuation value of the port #2 (specifically, an attenuation value of the wavelength channel #1 at the port #2) is adjusted to open the port #2. In this way, the wavelength channel #1 is switched from the port #1 to the port #2.

Figure 6:
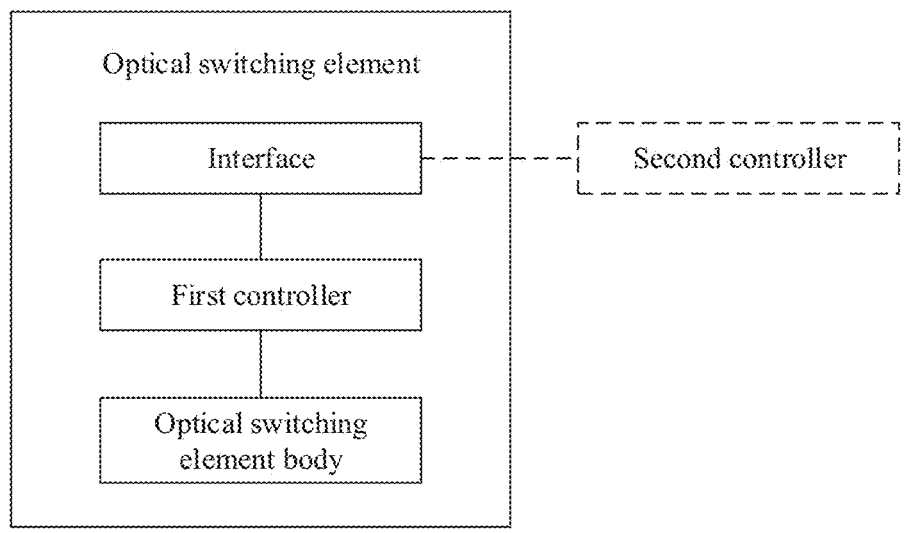
FIG. 6 is a schematic architectural diagram of an example of an optical switching element according to this application.

FIG. 6 is a schematic architectural diagram of an example of an optical switching element according to this application. As shown in FIG. 6, the optical switching element may include an optical switching entity and a controller (denoted as a controller #A).

The optical switching entity is configured to change, under control of the controller #A, a port state of a wavelength channel. For example, the port state may change from a normal state to a blocking state. For another example, the port state may change from a blocking state to a normal state. For another example, the wavelength channel may be switched from one port to another port. The controller #A is configured to control the optical switching entity based on the foregoing image.

For example, when the optical switching element is an LCOS, the optical switching entity may be a liquid crystal array or a pixel array. In this case, the controller #A is configured to control a state (for example, a phase state) of each pixel.

For another example, when the optical switching element is an MEMS, the optical switching entity may be a micro reflector array. In this case, the controller #A is configured to control a state (for example, a rotation angle) of each micro reflector.

By way of example but not limitation, the foregoing control image generation process may be performed by the controller #A.

Alternatively, a controller #B may perform the foregoing control image generation process, and send a generated control image to the controller #A. By way of example but not limitation, the controller #A and the controller #B are independently disposed.

Figure 7:
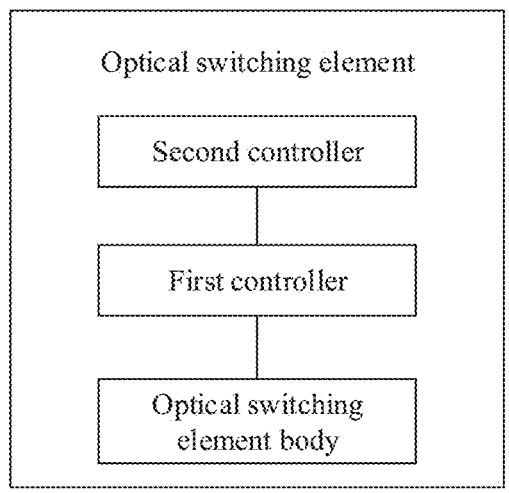
FIG. 7 is a schematic architectural diagram of another example of an optical switching element according to this application.

In an implementation, as shown in FIG. 7, the second controller is disposed in the optical switching element, for example, the LCOS.

Figure 8:
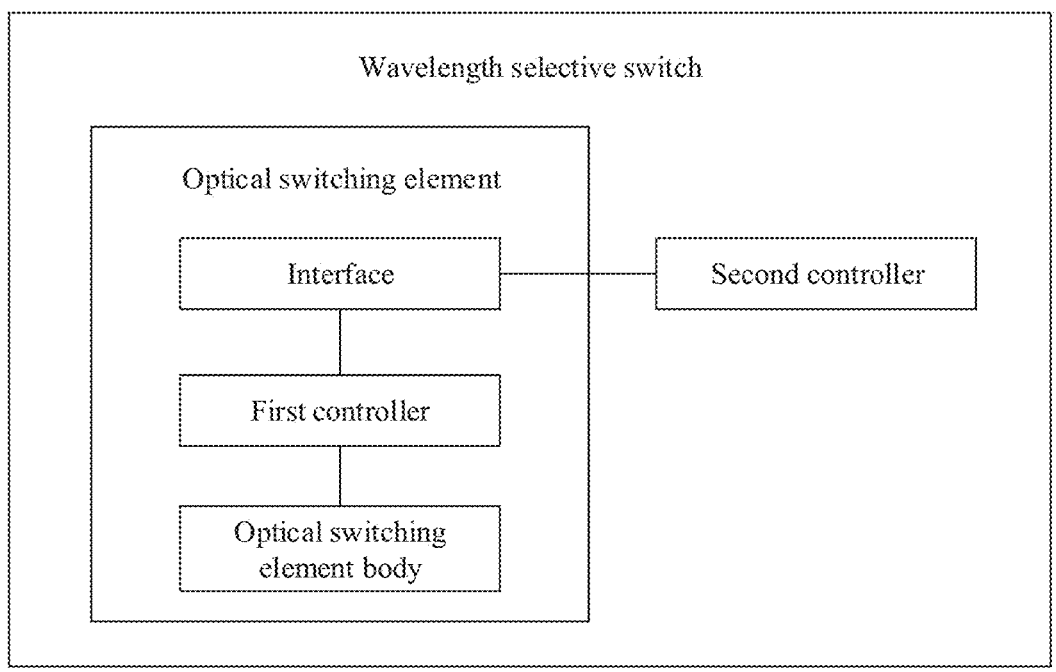
FIG. 8 is a schematic architectural diagram of an example of a WSS according to this application.

In another implementation, as shown in FIG. 8, the second controller may alternatively be disposed in a WSS. In other words, the second controller and the optical switching element (for example, the LCOS) are independently disposed.

The following describes the foregoing control image generation process in detail. For ease of understanding and description, a control image generation process used in a process of switching ports of M wavelength channels is used as an example for description.

Figure 9:
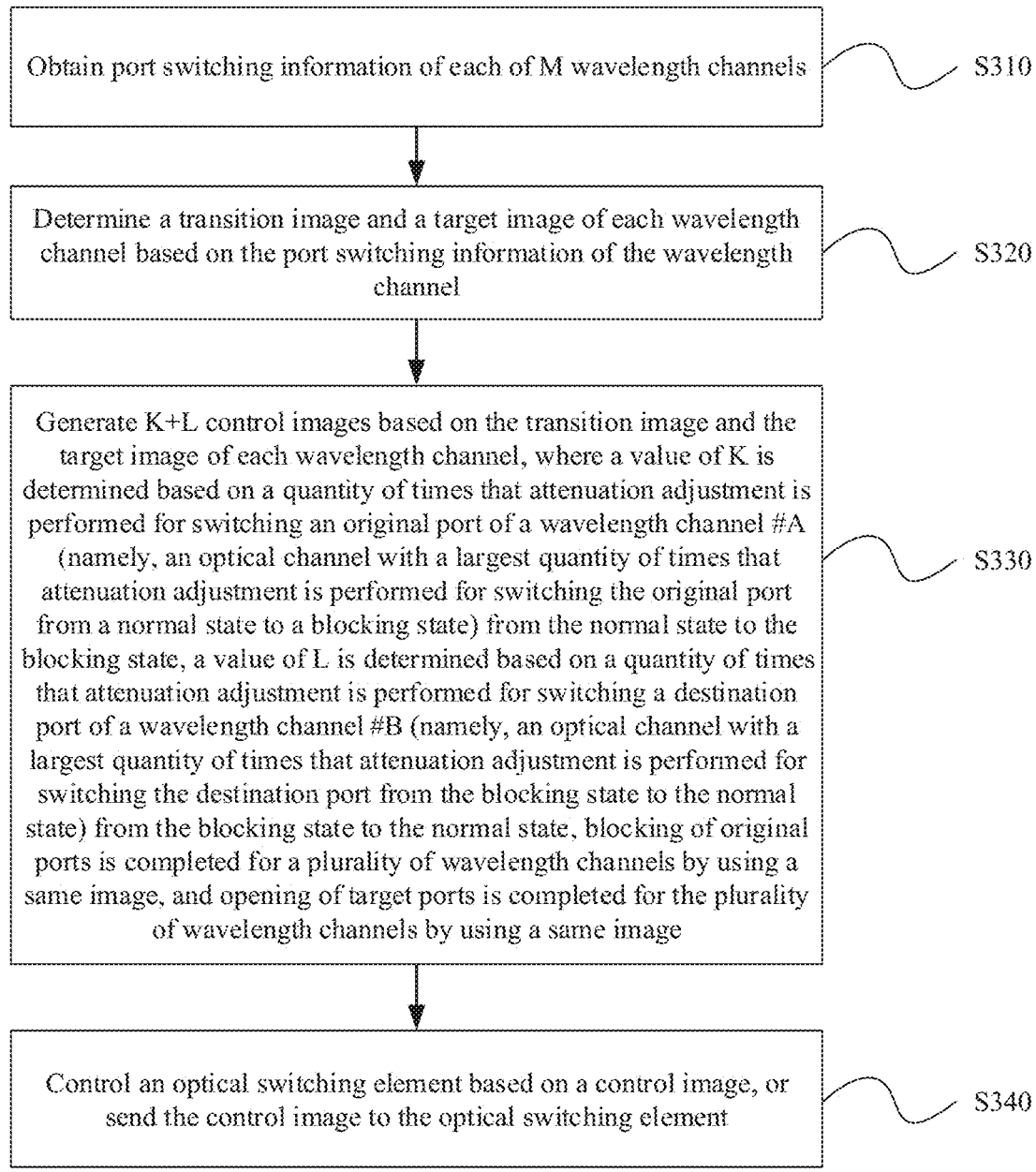
FIG. 9 is a schematic flowchart of an example of an image generation process according to an optical switching method in this application.

FIG. 9 shows a procedure of a control image generation process according to this application. As shown in FIG. 9, in S310, a controller (for example, the foregoing first controller or second controller) obtains port switching information or an optical cross-connect changing command of each of M wavelength channels.

By way of example but not limitation, the port switching information may be sent by a processor in a ROADM to the controller, or the port switching information may be entered by an administrator into the controller. This is not particularly limited in this application.

In this application, the port switching information of each wavelength channel includes at least one of the following information:

For ease of understanding and description, port switching information of a wavelength channel #1 is used as an example for description.

Information A: Information about an original port (denoted as a port #1a) of a wavelength channel #1, for example, an identifier of the port #1a and an attenuation value of the port #1a in a normal state.

Information B: Information about a destination port (denoted as a port #1b) of the wavelength channel #1, for example, an identifier of the port #1b and an attenuation value of the port #1b in the normal state.

In an implementation, the wavelength channel #1 has no destination port, that is, the wavelength channel #1 needs to be blocked. In this case, the port switching information of the wavelength channel #1 may include the information A.

In another implementation, the wavelength channel #1 has no original port, that is, the wavelength channel #1 needs to be opened. In this case, the port switching information of the wavelength channel #1 may include the information B.

In still another implementation, the wavelength channel #1 needs to be switched from the port #1a to the port #1b. In this case, the port switching information of the wavelength channel #1 may include the information A and the information B.

In S320, the controller determines, based on the port switching information of each of the M wavelength channels, images, namely, a transition image and a target image, that correspond to the wavelength channel and that are used to change a port state (or adjust a port attenuation value). In other words, the controller determines, based on the port switching information of each of the M wavelength channels, phase information used to adjust a port attenuation value of the wavelength channel for a pixel corresponding to the wavelength channel. It should be noted that the process may be similar to that in a conventional technology. To avoid repetition, detailed descriptions thereof are omitted herein.

In S330, the controller generates a plurality of control images based on the transition image and the target image of each of the M wavelength channels. Specifically, the controller determines, based on the transition image and the target image that correspond to each of the M wavelength channels, a sub-image corresponding to the wavelength channel in each control image.

In this application, the M wavelength channels include a plurality of type-A wavelength channels, and the type-A wavelength channel is a wavelength channel whose original port is switched from the normal state to a blocking state in a port switching process. For example, the type-A wavelength channel is a wavelength channel on which port blocking or port switching needs to be performed.

In addition, quantities of transition images corresponding to at least two of the plurality of type-A wavelength channels are different, and blocking of original ports is completed for the at least two wavelength channels by using a same control image.

In a possible implementation, wavelength channels for which blocking of original ports is completed by using a same control image are all of the plurality of type-A wavelength channels.

In another possible implementation, wavelength channels for which blocking of original ports is completed by using a same control image are some of the plurality of type-A wavelength channels. This is not particularly limited in this application.

In a related technology, for different wavelength channels, blocking of original ports are completed by using different control images, in other words, port blocking is performed for a plurality of times in a plurality of control images. Consequently, a problem of inaccurate gain control caused by gain competition and a hole-burning characteristic of an erbium-doped fiber amplifier (Erbium-doped Fiber Amplifier, EDFA) becomes common, that is, large power overshoot and undershoot may easily occur in a switching change process, severely affecting service stability.

In contrast, in this application, for at least two wavelength channels with different quantities of transition images, blocking of original ports is completed by using a same control image, so that the port blocking can be prevented from being performed in the plurality of control images. Therefore, the problem of inaccurate gain control caused by gain competition and the hole-burning characteristic of the EDFA can be reduced, and occurrence of power overshoot and undershoot can be reduced, thereby improving service stability.

By way of example but not limitation, in this application, the following manner may be used to determine a control image for completing simultaneous blocking of original ports for the at least two wavelength channels with different quantities of transition images by using a same image.

Specifically, the controller determines, in the plurality of type-A wavelength channels, a wavelength channel (denoted as a wavelength channel #A) on which an attenuation adjustment process is performed most frequently in a process of switching an original port from the normal state to the blocking state, and further determines a quantity K of times that attenuation adjustment needs to be performed on the wavelength channel #A in the process of switching the original port from the normal state to the blocking state, where K is an integer greater than or equal to 2.

Alternatively, the controller determines, in the plurality of type-A wavelength channels, a wavelength channel (namely, the foregoing wavelength channel #A) with a largest quantity of transition images that need to be used in the process of switching the original port from the normal state to the blocking state, and further determines a value of K.

In a possible case, the M wavelength channels include a plurality of type-B wavelength channels, and the type-B wavelength channel is a wavelength channel whose port switching process includes a process of switching a destination port from the blocking state to the normal state. For example, the type-B wavelength channel is a wavelength channel on which port opening or port switching needs to be performed.

In this case, the controller determines, in the plurality of type-B wavelength channels, a wavelength channel (denoted as a wavelength channel #B) on which attenuation adjustment is performed most frequently in a process of switching a destination port from the blocking state to the normal state, and further determines a quantity L of times that attenuation adjustment needs to be performed on the wavelength channel #B in the process of switching the destination port from the blocking state to the normal state, where L is an integer greater than or equal to 1.

Alternatively, the controller determines, in the plurality of type-B wavelength channels, a wavelength channel (namely, the foregoing wavelength channel #B) with a largest quantity of transition images that need to be used in the process of switching the destination port from the blocking state to the normal state, and further determines a value of L.

Therefore, the controller may generate K+L control images, where the K+L images are sequentially presented on an optical switching element in time sequence, or the K+L images are used to sequentially control the optical switching element in time sequence.

The first K images in the K+L images are used in a process of blocking an original port of the type-A wavelength channel in the M wavelength channels, and the last image in the first K images is used to complete blocking of at least two type-A wavelength channels. For example, the last image in the first K images is used to complete blocking of all the type-A wavelength channels.

In addition, the last L images in the K+L images are used in a process of opening an original port of the type-B wavelength channel in the M wavelength channels (or the process of switching from the blocking state to the normal state), and the $1^{st}$ image in the first L images is used to complete opening of at least two type-B wavelength channels. For example, the $1^{st}$ image in the last L images is used to complete opening of all the type-B wavelength channels.

The process of opening the destination port is performed after the process of blocking the original port ends, so that occurrence of power overshoot and undershoot can be further reduced, thereby further improving service stability.

It should be noted that the value of L may be 0. When the value of L is 0, it indicates that the M channels do not include a wavelength channel whose destination port needs to be opened. Therefore, the control image is used in the process of blocking the original port.

In a possible implementation, the K control images are in one-to-one correspondence with K attenuation adjustment ranges, and each control image is used for attenuation adjustment on at least one of the plurality of type-A wavelength channels in an attenuation range corresponding to the control image.

In addition, in a possible implementation, the L control images are in one-to-one correspondence with L attenuation adjustment ranges, and each control image is used for attenuation adjustment on at least one of the plurality of type-B wavelength channels in an attenuation range corresponding to the control image.

Figure 10:
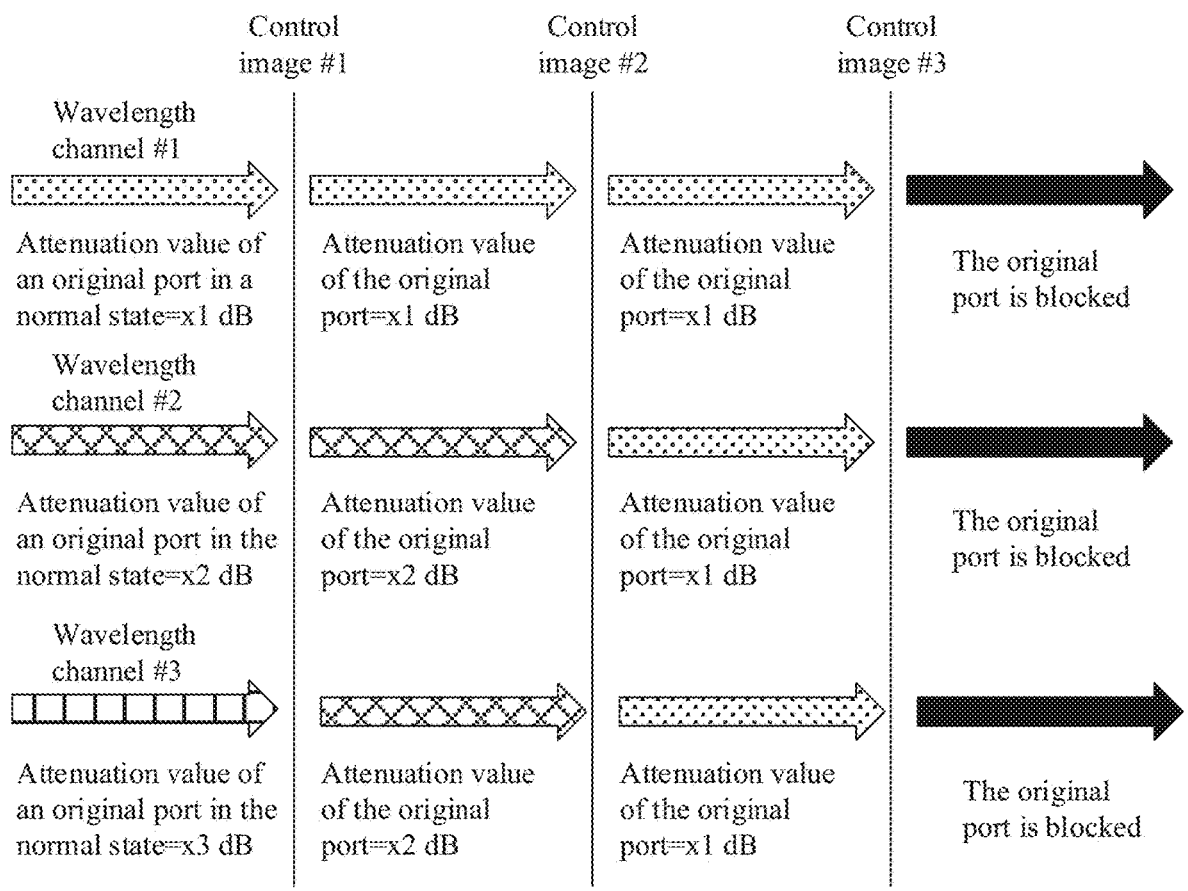
FIG. 10 is a schematic diagram of an example of port state switching of a plurality of wavelength channels according to the solution of this application.

For example, FIG. 10 shows an attenuation adjustment process that is performed based on three control images when M=3, K=3, and L=0. The three wavelength channels are denoted as a wavelength channel #1, a wavelength channel #2, and a wavelength channel #3 respectively.

An attenuation value of an original port of the wavelength channel #1 (in the normal state) is x1 dB, and attenuation adjustment needs to be performed once for switching the original port of the wavelength channel #1 from the normal state to the blocking state, that is, from x1 dB to an attenuation value (recorded as x0 dB) corresponding to the blocking state.

An attenuation value of an original port of the wavelength channel #2 (in the normal state) is x2 dB, and attenuation adjustment needs to be performed twice for switching the original port of the wavelength channel #2 from the normal state to the blocking state. To be specific, attenuation adjustment performed for the first time is to adjust the value from x2 dB to x1 dB, and attenuation adjustment performed for the second time is to adjust the value from x1 dB to x0 dB.

An attenuation value of an original port of the wavelength channel #3 (in the normal state) is x3 dB, and attenuation adjustment needs to be performed for three times for switching the original port of the wavelength channel #3 from the normal state to the blocking state. To be specific, attenuation adjustment performed for the first time is to adjust the value from x3 dB to x2 dB, attenuation adjustment performed for the second time is to adjust the value from x2 dB to x1 dB, and attenuation adjustment performed for the third time is to adjust the value from x1 dB to x0 dB.

As shown in FIG. 10, the last (or $3^{rd}$) control image (namely, a control image #3) in the three control images (in time sequence) is used in the attenuation adjustment process of adjusting the value from x1 dB to x0 dB. To be specific, blocking of the original ports is completed for the wavelength channel #1 to the wavelength channel #3 by using the same control image #3.

The $1^{st}$ control image (namely, a control image #1) in the three control images (in time sequence) is used in the attenuation adjustment process of adjusting the value from x3 dB to x2 dB. To be specific, attenuation adjustment for adjusting the attenuation value of the original port from x3 dB to x2 dB is completed for the wavelength channel #3 by using the control image #1. Because the attenuation values of the original ports of the wavelength channel #1 and the wavelength channel #2 are greater than or equal to x2 dB, a sub-image corresponding to the wavelength channel #1 in the control image #1 is the same as a sub-image of the wavelength channel #1 in the normal state (for example, phases of pixels at a same location in the two sub-images are the same), and a sub-image corresponding to the wavelength channel #2 in the control image #1 is the same as a sub-image of the wavelength channel #2 in the normal state.

The $2^{nd}$ control image (namely, a control image #2) in the three control images (in time sequence) is used in the attenuation adjustment process of adjusting the value from x2 dB to x1 dB. To be specific, attenuation adjustment for adjusting the attenuation values of the original ports from x2 dB to x1 dB is completed for the wavelength channel #3 and the wavelength channel #2 by using the control image #2. Because the attenuation value of the original port of the wavelength channel #1 is greater than or equal to x1 dB, a sub-image corresponding to the wavelength channel #1 in the control image #2 is the same as a sub-image of the wavelength channel #1 in the normal state (for example, phases of pixels at a same location in the two sub-images are the same).

Figure 11A:
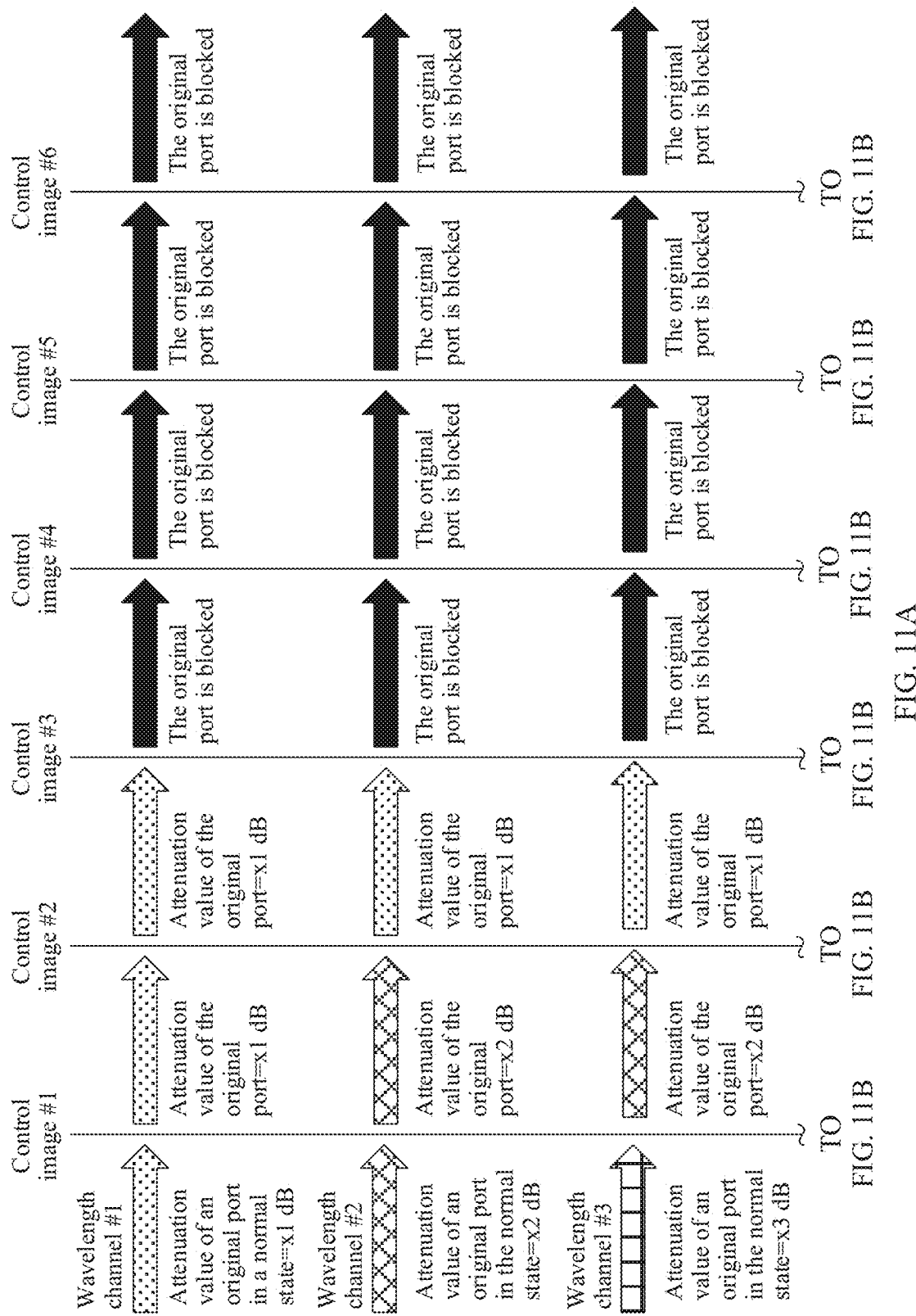
FIG. 11A and FIG. 11B are a schematic diagram of another example of port state switching of a plurality of wavelength channels according to the solution of this application.
Figure 11B:
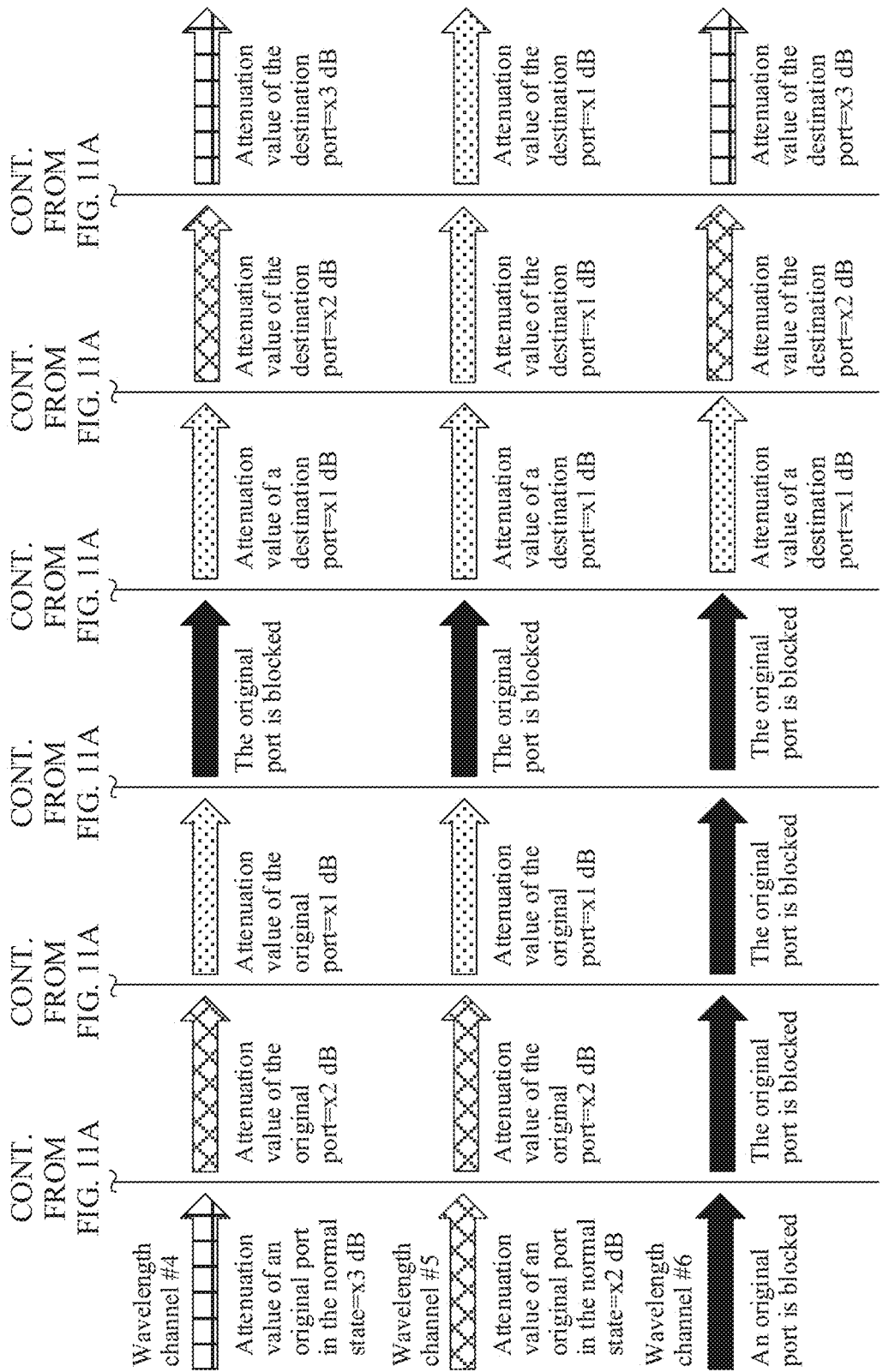

For another example, FIG. 11A and FIG. 11B show an attenuation adjustment process that is performed based on six control images when M=6, K=3, and L=3. The six wavelength channels are denoted as a wavelength channel #1, a wavelength channel #2, a wavelength channel #3, a wavelength channel #4, a wavelength channel #5, and a wavelength channel #6 respectively.

An original port of the wavelength channel #1 needs to be blocked, an attenuation value of the original port of the wavelength channel #1 (in the normal state) is x1 dB, and attenuation adjustment needs to be performed once for switching the original port of the wavelength channel #1 from the normal state to the blocking state, that is, from x1 dB to an attenuation value (recorded as x0 dB) corresponding to the blocking state.

An original port of the wavelength channel #2 needs to be blocked, an attenuation value of the original port of the wavelength channel #2 (in the normal state) is x2 dB, and attenuation adjustment needs to be performed twice for switching the original port of the wavelength channel #2 from the normal state to the blocking state. To be specific, attenuation adjustment performed for the first time is to adjust the value from x2 dB to x1 dB, and attenuation adjustment performed for the second time is to adjust the value from x1 dB to x0 dB.

An original port of the wavelength channel #3 needs to be blocked, an attenuation value of the original port of the wavelength channel #3 (in the normal state) is x3 dB, and attenuation adjustment needs to be performed for three times for switching the original port of the wavelength channel #3 from the normal state to the blocking state. To be specific, attenuation adjustment performed for the first time is to adjust the value from x3 dB to x2 dB, attenuation adjustment performed for the second time is to adjust the value from x2 dB to x1 dB, and attenuation adjustment performed for the third time is to adjust the value from x1 dB to x0 dB.

The wavelength channel #4 needs to be switched from an original port to a destination port, to be specific, the original port needs to be blocked and the destination port needs to be opened. An attenuation value of the original port of the wavelength channel #4 (in the normal state) is x3 dB, an attenuation value of the destination port of the wavelength channel #4 (in the normal state) is x3 dB, and attenuation adjustment need to be performed for six times in a port switching process of the wavelength channel #4. To be specific, attenuation adjustment performed for the first time is to adjust the attenuation value of the original port from x3 dB to x2 dB, attenuation adjustment performed for the second time is to adjust the attenuation value of the original port from x2 dB to x1 dB, attenuation adjustment performed for the third time is to adjust the attenuation value of the original port from x1 dB to x0 dB, attenuation adjustment performed for the fourth time is to adjust the attenuation value of the destination port from x0 dB to x1 dB, attenuation adjustment performed for the fifth time is to adjust the attenuation value of the destination port from x1 dB to x2 dB, and attenuation adjustment performed for the sixth time is to adjust the attenuation value of the destination port from x2 dB to x3 dB.

The wavelength channel #5 needs to be switched from an original port to a destination port, to be specific, the original port needs to be blocked and the destination port needs to be opened, an attenuation value of the original port of the wavelength channel #5 (in the normal state) is x2 dB, an attenuation value of the destination port of the wavelength channel #5 (in the normal state) is x1 dB, and attenuation adjustment need to be performed for three times in a port switching process of the wavelength channel #5. To be specific, attenuation adjustment performed for the first time is to adjust the attenuation value of the original port from x2 dB to x1 dB, attenuation adjustment performed for the second time is to adjust the attenuation value of the original port from x1 dB to x0 dB, and attenuation adjustment performed for the third time is to adjust the attenuation value of the destination port from x0 dB to x1 dB.

For the wavelength channel #6, a destination port needs to opened, an attenuation value of the destination port of the wavelength channel #6 (in the normal state) is x3 dB, and attenuation adjustment needs to be performed for three times for switching the destination port of the wavelength channel #6 from the blocking state to the normal state. To be specific, attenuation adjustment performed for the first time is to adjust the value from x0 dB to x1 dB, attenuation adjustment performed for the second time is to adjust the value from x1 dB to x2 dB, and attenuation adjustment performed for the third time is to adjust the value from x2 dB to x3 dB.

As shown in FIG. 11A and FIG. 11B, the $3^{rd}$ control image (namely, a control image #3) in the six control images (in time sequence) is used in the attenuation adjustment process of adjusting the value from x1 dB to x0 dB. To be specific, blocking of the original ports is completed for the wavelength channel #1 to the wavelength channel #5 by using the same control image #3.

The $4^{th}$ control image (namely, a control image #4) in the six control images (in time sequence) is used in the attenuation adjustment process of adjusting the value from x0 dB to x1 dB. To be specific, the destination ports are opened for the wavelength channel #4 to the wavelength channel #6 by using the same control image #4.

The $1^{st}$ control image (namely, a control image #1) in the six control images (in time sequence) is used in the attenuation adjustment process of adjusting the value from x3 dB to x2 dB. To be specific, attenuation adjustment for adjusting the attenuation values of the original ports from x3 dB to x2 dB is completed for the wavelength channel #3 and the wavelength channel #4 by using the control image #1. Because the attenuation values of the original ports of the wavelength channel #1, the wavelength channel #2, and the wavelength channel #5 are greater than or equal to x2 dB, a sub-image corresponding to the wavelength channel #1 in the control image #1 is the same as a sub-image of the wavelength channel #1 in the normal state (for example, phases of pixels at a same location in the two sub-images are the same), a sub-image corresponding to the wavelength channel #2 in the control image #1 is the same as a sub-image of the wavelength channel #2 in the normal state, and a sub-image corresponding to the wavelength channel #5 in the control image #1 is the same as a sub-image of the wavelength channel #5 in the normal state. In addition, a sub-image corresponding to the wavelength channel #6 in the control image #1 is used to enable the wavelength channel #6 to maintain the blocking state.

The $2^{nd}$ control image (namely, a control image #2) in the six control images (in time sequence) is used in the attenuation adjustment process of adjusting the value from x2 dB to x1 dB. To be specific, attenuation adjustment for adjusting the attenuation values of the original ports from x2 dB to x1 dB is completed for the wavelength channel #2, the wavelength channel #3, the wavelength channel #4, and the wavelength channel #5 by using the control image #2. Because the attenuation value of the original port of the wavelength channel #1 is greater than or equal to x1 dB, a sub-image corresponding to the wavelength channel #1 in the control image #2 is the same as a sub-image of the wavelength channel #1 in the normal state (for example, phases of pixels at a same location in the two sub-images are the same). In addition, a sub-image corresponding to the wavelength channel #6 in the control image #2 is used to enable the wavelength channel #6 to maintain the blocking state.

The $5^{th}$ control image (namely, a control image #5) in the six control images (in time sequence) is used in the attenuation adjustment process of adjusting the value from x1 dB to x2 dB. To be specific, attenuation adjustment for adjusting the attenuation value of the destination port from x1 dB to x2 dB is completed for the wavelength channel #4 and the wavelength channel #6 by using the control image #5. Because the attenuation value of the destination port of the wavelength channel #5 in the normal state is greater than or equal to x1 dB, a sub-image corresponding to the wavelength channel #5 in the control image #5 is the same as a sub-image of the wavelength channel #5 in the normal state (for example, phases of pixels at a same location in the two sub-images are the same). In addition, sub-images corresponding to the wavelength channel #1 to the wavelength channel #3 in the control image #5 are used to enable the original ports of the wavelength channel #1 to the wavelength channel #3 to maintain the blocking state.

The $6^{th}$ control image (namely, a control image #6) in the six control images (in time sequence) is used in the attenuation adjustment process of adjusting the value from x2 dB to x3 dB. To be specific, attenuation adjustment for adjusting the attenuation value of the destination port from x2 dB to x3 dB is completed for the wavelength channel #4 and the wavelength channel #6 by using the control image #6. Because the attenuation value of the destination port of the wavelength channel #5 in the normal state is greater than or equal to x2 dB, a sub-image corresponding to the wavelength channel #5 in the control image #6 is the same as a sub-image of the wavelength channel #5 in the normal state (for example, phases of pixels at a same location in the two sub-images are the same). In addition, sub-images corresponding to the wavelength channel #1 to the wavelength channel #3 in the control image #6 are used to enable the original ports of the wavelength channel #1 to the wavelength channel #3 to maintain the blocking state.

In S340, when the controller is a controller of the optical switching element (for example, an LCOS), the controller controls the optical switching element, for example, a liquid crystal display of the LCOS, based on the generated control image.

When the controller and the optical switching element (for example, the LCOS) are independently disposed, the controller sequentially sends the plurality of control images to the optical switching element, so that the optical switching element can perform optical path crossing based on the received control images.

Figure 12:
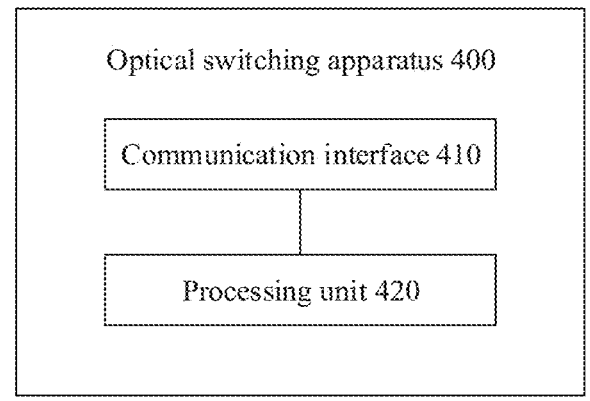
FIG. 12 is a schematic diagram of an example of an optical switching apparatus according to this application.

FIG. 12 is a schematic block diagram of an optical switching apparatus according to this application. As shown in FIG. 12, the apparatus 400 includes a communication interface 410 and a processing unit 420.

The processing unit 420 is configured to perform the foregoing control image generation process, that is, a specific process of S310 to S330. To avoid repetition, detailed descriptions thereof are omitted herein.

For example, the communication interface 410 is configured to perform the foregoing control image sending process, that is, a process of sending the control image to the optical switching element (or the controller in the optical switching element) in S340. To avoid repetition, detailed descriptions thereof are omitted herein.

In the foregoing implementations, the communication interface 410 may include an output interface, and the output interface is configured to implement an output (or a sending) function.

Optionally, the communication interface 410 may further include an input interface. The input interface is configured to implement an input (or a receiving) function, for example, input of port switching information of each of the foregoing M wavelength channels. This is not limited herein.

Optionally, the communication interface 410 may alternatively be an interface circuit. For example, the receiver circuit may include an input circuit and an output circuit.

Optionally, in an example, the apparatus 400 may be the controller in the method embodiment, or the controller has a chip, an integrated circuit, a component, a module, or the like that implements functions of the foregoing controller.

Optionally, the processing unit 420 may be a processing apparatus. The function of the processing apparatus may be implemented by hardware, or may be implemented by hardware executing corresponding software. For example, the processing apparatus may include at least one processor and at least one memory. The at least one memory is configured to store a computer program. The at least one processor reads and executes the computer program stored in the at least one memory, so that the apparatus 400 performs operations and/or processing performed by the controller in the method embodiments.

Optionally, the processing apparatus may include only a processor, and the memory configured to store the computer program is located outside the processing apparatus. The processor is connected to the memory by using a circuit/wire to read and execute the computer program stored in the memory.

In some examples, the processing apparatus may alternatively be a chip or an integrated circuit. For example, the processing apparatus includes a processing circuit/logic circuit and an interface circuit. The interface circuit is configured to: receive a signal and/or data, and transmit the signal and/or data to the processing circuit. The processing circuit processes the signal and/or the data, to implement functions of the control component in the method embodiments.

Figure 13:
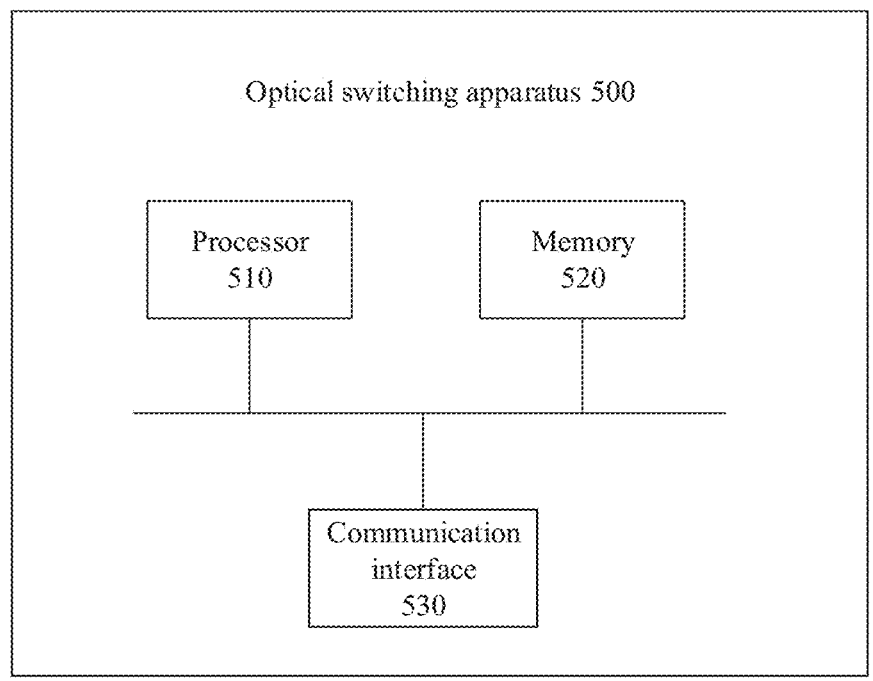
FIG. 13 is a schematic diagram of another example of an optical switching apparatus according to this application.

FIG. 13 is a schematic diagram of a structure of an optical switching apparatus according to this application. As shown in FIG. 13, the optical switching apparatus 500 includes one or more processors 510, one or more memories 520, and one or more communication interfaces 530. The processor 510 is configured to control the communication interface 530 to send and receive information. The memory 520 is configured to store a computer program. The processor 510 is configured to invoke the computer program from the memory 520 and run the computer program, so that the optical switching apparatus 500 performs processing and/or operations performed by the controller in the method embodiments of this application, that is, the actions of S310 to S340.

For example, the processor 510 may have a function of the processing unit 420 in FIG. 12, and the communication interface 530 may have a function of the communication interface 410 in FIG. 12.

Optionally, the memory and the processor in the foregoing apparatus embodiments may be physically independent units, or the memory may be integrated into the processor. This is not limited in this specification.

In addition, this application further provides a computer-readable storage medium. The computer-readable storage medium stores computer instructions. When the computer instructions are run on a computer, the computer is enabled to perform the operation and/or procedure performed by the controller in the method embodiments of this application.

In addition, this application further provides a computer program product. The computer program product includes computer program code or instructions. When the computer program code or the instructions are run on a computer, the operation and/or procedure performed by the controller in the method embodiments of this application are/is performed.

In addition, this application further provides a chip. The chip includes a processor. A memory configured to store a computer program is disposed independent of the chip. The processor is configured to execute the computer program stored in the memory, so that a controller in which the chip is installed performs the operation and/or processing performed by the controller in any method embodiment.

Further, the chip may include a communication interface. The communication interface may be an input/output interface, an interface circuit, or the like. Further, the chip may include the memory.

In addition, this application further provides a communication apparatus (for example, may be a chip), including a processor and a communication interface. The communication interface is configured to receive a signal and transmit the signal to the processor, and the processor processes the signal, so that the operation and/or processing performed by the controller in any method embodiment are/is performed.

In addition, this application further provides an optical switching apparatus, including at least one processor, the at least one processor is coupled to at least one memory, and the at least one processor is configured to execute a computer program or instructions stored in the at least one memory, so that the operation and/or processing performed by the controller in any method embodiment are/is performed.

In addition, this application further provides an optical switching element (for example, an LCOS), including the foregoing controller, or the optical switching element has a function of implementing the optical switching element (specifically, a controller configured to generate a control image in the optical switching element) in embodiments of this application.

This application further provides a WSS apparatus, including the optical switching element (for example, the LCOS) in embodiments of this application.

This application further provides a WSS apparatus, including the optical switching element (for example, the LCOS) and the controller in embodiments of this application.

This application further provides an optical switching apparatus, including the foregoing WSS apparatus.

The processor in embodiments of this application may be an integrated circuit chip, and has a signal processing capability. In an implementation process, steps in the foregoing method embodiments may be implemented by using a hardware integrated logic circuit in the processor or an instruction in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

In embodiments of this application, the memory may be a volatile memory or a nonvolatile memory, or may include both the volatile memory and the nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DRRAM). It should be noted that memories in the system and method described in this specification include but are not limited to the memories and memories of any other proper types.

Figure 14:
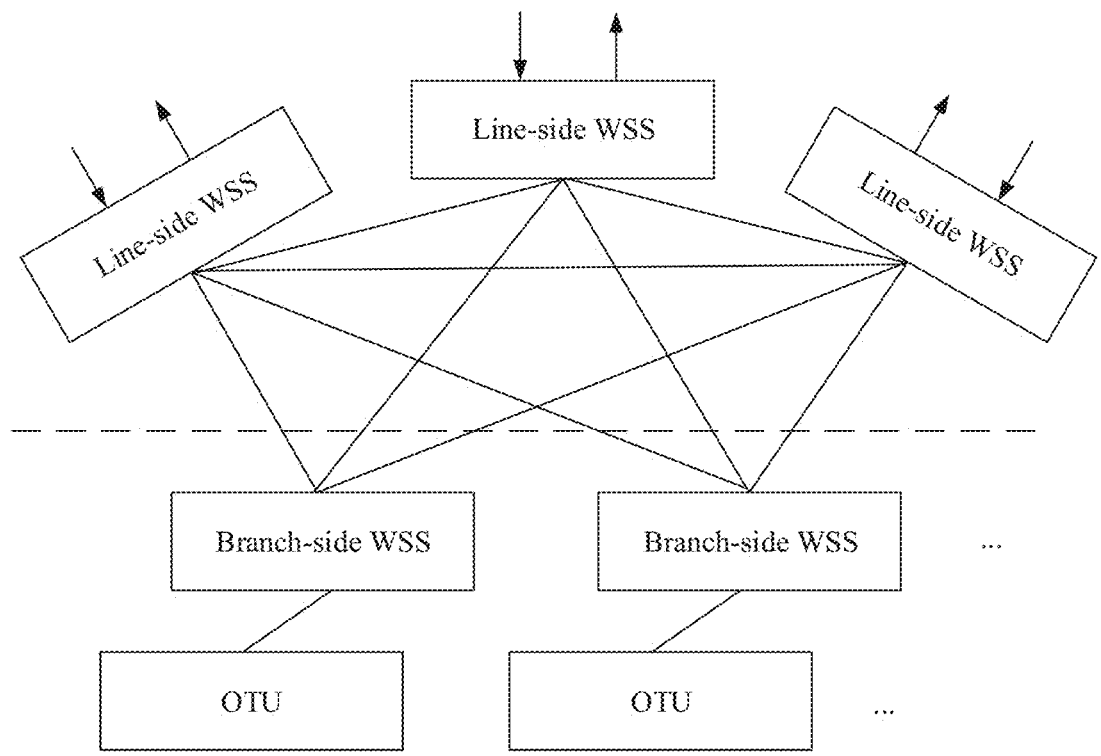
FIG. 14 is a schematic diagram of a structure of a ROADM network of a WSS applicable to this application.

FIG. 14 is a schematic diagram of a structure of a ROADM network of a WSS applicable to this application. As shown in FIG. 14, a branch-side WSS is used for dynamic branch-side control, that is, connectivity of a service in one or more optical transform units (Optical Transform Units, OTUs) connected to the WSS is controlled by the WSS. A line-side WSS is used for dynamic direction control. Different WSSs are connected to optical fibers that are in different directions. A direction is selected by the line-side WSS for a service that has been selected by the branch-side WSS. The foregoing multi-stage WSS combination enables a station to have a dynamic wavelength switching capability, and a network including a plurality of stations having similar structures is a ROADM network.

A change of a switching state of any WSS in the ROADM network causes a change of a wavelength connectivity state of a back-end optical fiber link of the network (where inaccurate gain control occurs in an EDFA in a wavelength connectivity state change process). Therefore, the present invention is applicable to all WSSs participating in networking in the ROADM network.

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. Division into units is merely logical function of division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, function units in embodiments of this application may be integrated into one processing unit, or each of the units may exist alone physically, or two or more units are integrated into one unit. When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in embodiments of this application.

The foregoing descriptions are merely specific implementations of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical switching method, wherein the method comprises:
    generating K images that are consecutive in time sequence, wherein at least two wavelength channels comprise a first wavelength channel and at least one second wavelength channel, wherein the first wavelength channel and the at least one second wavelength channel are switched to a blocking state through a same image in the K images, K is an integer greater than or equal to 2, a value of K depends on a quantity of times that attenuation adjustment is performed for switching the first wavelength channel from a normal state to the blocking state, each of the K images comprises a first sub-image and a second sub-image, the first sub-image indicates an attenuation adjustment value of the first wavelength channel, and the second sub-image indicates an attenuation adjustment value of the at least one second wavelength channel, wherein the K images are in one-to-one correspondence with K attenuation ranges, and each of the K images is used for attenuation adjustment on at least one wavelength channel in an attenuation range corresponding to the respective image; and
    sending information about the K images to an optical switching element to enable the optical switching element to perform attenuation adjustment on the first wavelength channel and the at least one second wavelength channel.

2. The method according to claim 1, wherein the quantity of times is greater than or equal to a first threshold.

3. The method according to claim 1, wherein the at least one second wavelength channel comprises a plurality of wavelength channels, in the at least two wavelength channels, whose switching states are from the normal state to the blocking state.

4. The method according to claim 1, wherein in the K images, an image used to perform attenuation adjustment on the first wavelength channel for a first time is different from an image used to perform attenuation adjustment on the at least one second wavelength channel for the first time.

5. The method according to claim 1, wherein an image used to perform attenuation adjustment on the at least one second wavelength channel for a first time is an image following a $1^{st}$ image in the K images.

6. The method according to claim 1, wherein the at least two wavelength channels further comprise a third wavelength channel, and the method further comprises:
generating L images that are consecutive in time sequence, wherein L is an integer greater than or equal to 1, a value of L depends on a quantity of times that attenuation adjustment is performed for switching the third wavelength channel from the blocking state to the normal state, the first wavelength channel and the at least one second wavelength channel are switched to the blocking state through a particular image in the K images, and a $1^{st}$ image in the L images follows the particular image in time sequence; and
sending information about the L images to the optical switching element, to enable the optical switching element to perform attenuation adjustment on the third wavelength channel.

7. An optical switching method, wherein the method comprises:
obtaining K images that are consecutive in time sequence, wherein an optical switching element comprises at least two wavelength channels, the at least two wavelength channels comprising a first wavelength channel and at least one second wavelength channel, wherein the first wavelength channel and the at least one second wavelength channel are switched to a blocking state through a same image in the K images, K is an integer greater than or equal to 2, a value of K depends on a quantity of times that attenuation adjustment is performed for switching the first wavelength channel from a normal state to the blocking state, each of the K images comprises a first sub-image and a second sub-image, the first sub-image indicates an attenuation adjustment value of the first wavelength channel, and the second sub-image indicates an attenuation adjustment value of the at least one second wavelength channel, wherein the K images are in one-to-one correspondence with K attenuation ranges, and each of the K images is used for attenuation adjustment on at least one wavelength channel in an attenuation range corresponding to the respective image; and
performing attenuation adjustment on the first wavelength channel and the at least one second wavelength channel based on the K images.

8. The method according to claim 7, wherein the quantity of times is greater than or equal to a first threshold.

9. The method according to claim 7, wherein the at least one second wavelength channel comprises a plurality of wavelength channels, in the at least two wavelength channels, whose switching states are from the normal state to the blocking state.

10. The method according to claim 7, wherein in the K images, an image used to perform attenuation adjustment on the first wavelength channel for a first time is different from an image used to perform attenuation adjustment on the at least one second wavelength channel for the first time.

11. The method according to claim 7, wherein an image used to perform attenuation on the at least one second wavelength channel for a first time is an image following a $1^{st}$ image in the K images.

12. The method according to claim 7, wherein the at least two wavelength channels further comprise a third wavelength channel, and the method further comprises:
receiving L images that are consecutive in time sequence, wherein L is an integer greater than or equal to 1, a value of L depends on a quantity of times that attenuation adjustment is performed for switching the third wavelength channel from the blocking state to the normal state, the first wavelength channel and the at least one second wavelength channel are switched to the blocking state through a particular image in the K images, and a $1^{st}$ image in the L images follows the particular image in time sequence; and
performing attenuation adjustment on the third wavelength channel based on the L images.

13. A liquid crystal on silicon (LCOS), comprising:
a liquid crystal display, comprising a plurality of pixels, wherein phase states of the plurality of pixels are adjustable;
an interface, configured to obtain K images that are consecutive in time sequence, wherein the LCOS comprises at least two wavelength channels, the at least two wavelength channels comprising a first wavelength channel and at least one second wavelength channel, wherein the first wavelength channel and the at least one second wavelength channel are switched to a blocking state through a same image in the K images, K is an integer greater than or equal to 2, a value of K depends on a quantity of times that attenuation adjustment is performed for switching the first wavelength channel from a normal state to the blocking state, each of the K images comprises a first sub-image and a second sub-image, the first sub-image indicates an attenuation adjustment value of the first wavelength channel, and the second sub-image indicates an attenuation adjustment value of the at least one second wavelength channel, wherein the K images are in one-to-one correspondence with K attenuation ranges, and each of the K images is used for attenuation adjustment on at least one wavelength channel in an attenuation range corresponding to the respective image; and
a controller, configured to control the phase states of the plurality of pixels of the liquid crystal display based on the K images to perform attenuation adjustment on the first wavelength channel and the at least one second wavelength channel.

14. The LCOS according to claim 13, wherein the quantity of times is greater than or equal to a first threshold.

15. The LCOS according to claim 13, wherein the at least one second wavelength channel comprises a plurality of wavelength channels, in the at least two wavelength channels, whose switching states are from the normal state to the blocking state.

16. The LCOS according to claim 13, wherein in the K images, an image used to perform attenuation adjustment on the first wavelength channel for a first time is different from an image used to perform attenuation adjustment on the at least one second wavelength channel for the first time.

17. The LCOS according to claim 13, wherein an image used to perform attenuation on the at least one second wavelength channel for a first time is an image following a $1^{st}$ image in the K images.

18. The LCOS according to claim 13, wherein the at least two wavelength channels further comprise a third wavelength channel, and the interface is configured to:
- generate L images that are consecutive in time sequence, wherein L is an integer greater than or equal to 1, a value of L depends on a quantity of times that attenuation adjustment is performed for switching the third wavelength channel from the blocking state to the normal state, the first wavelength channel and the at least one second wavelength channel are switched to the blocking state through a particular image in the K images, and a $1^{st}$ image in the L images follows the particular image in time sequence; and
- send information about the L images to an optical switching element, to enable the optical switching element to perform attenuation adjustment on the third wavelength channel.

\* \* \* \* \*